United States Patent
Kawabe

(10) Patent No.: US 11,023,404 B2
(45) Date of Patent: Jun. 1, 2021

(54) DAISY CHAIN CONNECTION SYSTEM AND SYSTEM CONTROL METHOD

(71) Applicant: HITACHI, LTD., Tokyo (JP)

(72) Inventor: Takumi Kawabe, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/823,609

(22) Filed: Mar. 19, 2020

(65) Prior Publication Data

US 2020/0401547 A1    Dec. 24, 2020

(30) Foreign Application Priority Data

Jun. 20, 2019    (JP) .............................. JP2019-114997

(51) Int. Cl.
*G06F 13/42*    (2006.01)
*G06F 1/329*    (2019.01)
*G06F 1/3206*    (2019.01)

(52) U.S. Cl.
CPC ........ *G06F 13/4247* (2013.01); *G06F 1/3206* (2013.01); *G06F 1/329* (2013.01)

(58) Field of Classification Search
CPC ..... G06F 13/4247; G06F 1/3206; G06F 1/329
See application file for complete search history.

(56) References Cited

U.S. PATENT DOCUMENTS

| | | | | |
|---|---|---|---|---|
| 2005/0250533 A1* | 11/2005 | El-Batal | ................ | G06F 3/0626 455/552.1 |
| 2008/0080131 A1* | 4/2008 | Hori | ...................... | G06F 3/0689 361/679.31 |
| 2009/0013215 A1* | 1/2009 | Kakihara | ............... | G06F 1/3221 714/43 |
| 2010/0109931 A1* | 5/2010 | Esnard | .............. | H04W 52/0235 341/176 |
| 2014/0195859 A1* | 7/2014 | Dickenson | .......... | G06F 11/0745 714/43 |
| 2019/0239276 A1* | 8/2019 | Virtanen | ............... | H04W 76/18 |

FOREIGN PATENT DOCUMENTS

JP    2008-090352 A    4/2008

* cited by examiner

*Primary Examiner* — Tim T Vo
*Assistant Examiner* — Phong H Dang
(74) *Attorney, Agent, or Firm* — Volpe Koenig

(57) ABSTRACT

A system having information equipment connected in a daisy chain, where power supply control of the daisy chain-connected information equipment is performed without having to add a dedicated power supply control device. In a daisy chain connection system, second information equipment comprise a control unit and a power supply unit, and a first information equipment and the control unit of the second information equipment include a communication circuit capable of wired communication, and the first information equipment and the power supply unit of the second information equipment include a wireless circuit capable of wireless communication. When turning OFF a power supply to any one of the second information equipment, the first information equipment requests the power supply unit to stop the power supply by using wireless communication, and the power supply unit performs control for stopping the power supply to the control unit according to the request.

8 Claims, 14 Drawing Sheets

| MODULE (301) | DEVICE ID (302) | MEMORY ADDRESS (303) | REMARKS (304) |
|---|---|---|---|
| CONTROL UNIT | SLxx-C | xx | UNIQUE INFORMATION SUCH AS PRODUCT NUMBER |
| | | xx | PRESENCE OR ABSENCE OF MALFUNCTION, OPERATING STATUS, OUTPUT CONTROL, ETC. |
| POWER SUPPLY UNIT | SLxx-P | xx | UNIQUE INFORMATION SUCH AS PRODUCT NUMBER |
| | | xx | PRESENCE OR ABSENCE OF MALFUNCTION, OPERATING STATUS, OUTPUT CONTROL, ETC. |

| No | ENCLOSURE NAME | TYPE | ENCLOSURE ID |
|---|---|---|---|
| 1 | MASTER ENCLOSURE | MASTER | MS |
| 2 | SLAVE ENCLOSURE 00 | SLAVE | SL00 |
| 3 | SLAVE ENCLOSURE 01 | SLAVE | SL01 |
| 4 | SLAVE ENCLOSURE 02 | SLAVE | SL02 |
| 5 | SLAVE ENCLOSURE 03 | SLAVE | SL03 |
| ... | ... | ... | ... |
| xx | SLAVE ENCLOSURE xx | SLAVE | SLxx |

| ENCLOSURE ID | MODULE | DEVICE TYPE | DEVICE ID |
|---|---|---|---|
| MS | CONTROL UNIT | MASTER | MS |
| SL00 | CONTROL UNIT | SLAVE | SL00-C |
| SL00 | POWER SUPPLY UNIT | SLAVE | SL00-P |
| SL01 | CONTROL UNIT | SLAVE | SL01-C |
| SL01 | POWER SUPPLY UNIT | SLAVE | SL01-P |
| SL02 | CONTROL UNIT | SLAVE | SL02-C |
| SL02 | POWER UNIT | SLAVE | SL02-P |
| SL03 | CONTROL UNIT | SLAVE | SL03-C |
| SL03 | POWER SUPPLY UNIT | SLAVE | SL03-P |
| ... | ... | ... | ... |
| SLxx | CONTROL UNIT | SLAVE | SLxx-C |
| SLxx | POWER SUPPLY UNIT | SLAVE | SLxx-P |

331 / 332 / 333 / 334

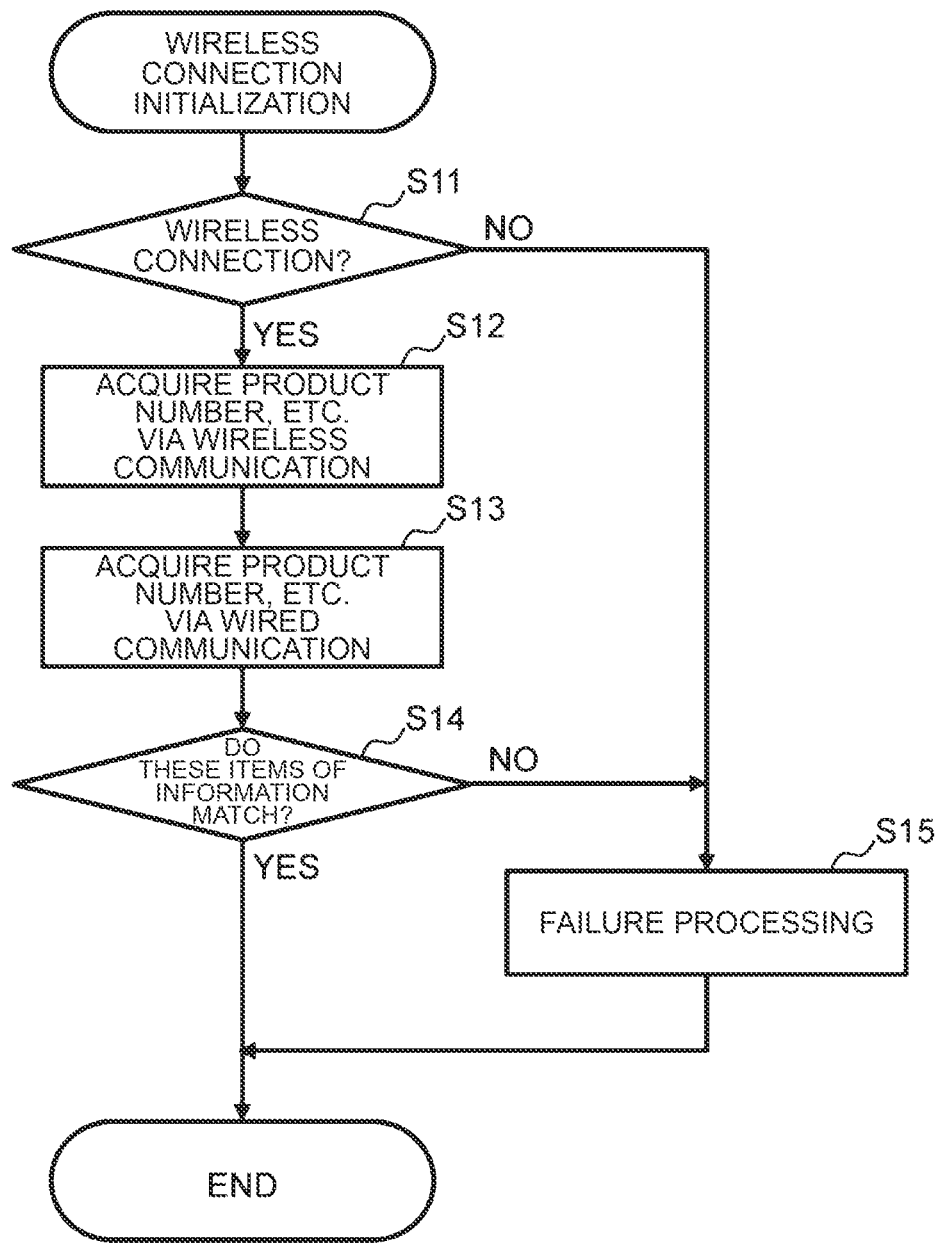

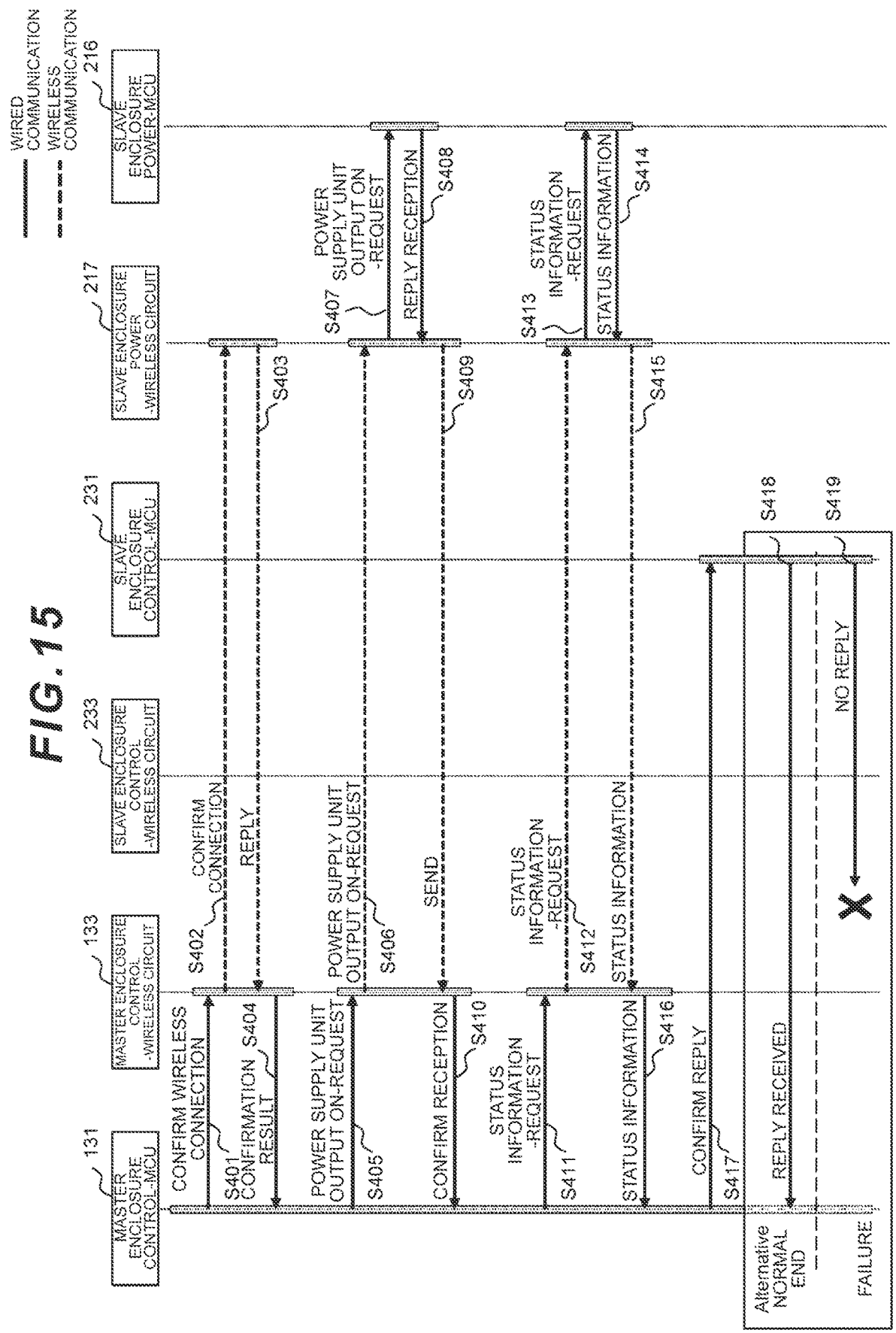

DAISY CHAIN CONNECTION SYSTEM AND SYSTEM CONTROL METHOD

TECHNICAL FIELD

The present invention relates to a daisy chain connection system in which a plurality of information equipment are connected in a daisy chain, and to a control method thereof.

BACKGROUND ART

Conventionally, as a method of connecting a plurality of information equipment, known is a technology referred to as "daisy chain" in which a plurality of information equipment are connected by being linked together with a cable. For example, in a storage system, by connecting a plurality of drive enclosures (information equipment) in a daisy chain, the number of drives that can be mounted on the storage system can be increased.

With a conventional storage system using a daisy chain, data is communicated to a subsequent-enclosure drive enclosure via a preceding-enclosure drive enclosure, and, based on such data communication between the drives, status information indicating the data read from the drive, data to be written into the drive, and failure information in the respective drive enclosures is mainly exchanged. Consequently, if one of the enclosures connected by being linked together stops due to a malfunction or the power supply being turned OFF, information can no longer be exchanged with the enclosure connected to the subsequent enclosure.

Here, as a technology of realizing a power saving function in a daisy chain-connected system, there is, for example, the storage control device disclosed in PTL 1. The storage control device of PTL 1 aims to reduce the power consumption by stopping the power distribution to the enclosures that are not being accessed, and is configured by comprising a first enclosure and a plurality of second enclosures that are connected in a daisy chain, and well as a power supply circuit unit including a switch for communicating or blocking the power supply path of the respective second enclosures. The storage control device of PTL 1 performs step-by-step power saving control of spinning down the drive, stopping the power supply to the drive, and stopping the power supply to the enclosure based on the status of each enclosure. Among the above, stopping the power supply to the enclosure is performed when there is no exchange of information with the enclosure connected to the subsequent enclosure; that is, when the power supply to all enclosures connected to the subsequent enclosure has been stopped, and, specifically, the power supply to a predetermined second enclosure is stopped by the power supply circuit unit operating the switch according to instructions from the first enclosure.

CITATION LIST

Patent Literature

[PTL 1] Japanese Unexamined Patent Application Publication No. 2008-090352

SUMMARY OF THE INVENTION

Problems to be Solved by the Invention

As described above, the storage control device disclosed in PTL 1 can realize a power saving function while giving consideration to the communication with the enclosure connected to the subsequent enclosure in the daisy chain. Nevertheless, because the storage control device disclosed in PTL 1 requires the separate mounting of a device (power supply circuit unit) for performing the power supply control of each second enclosure separate from the daisy chain-connected system (first enclosure and plurality of second enclosures), the following problems may arise; namely, increase of cost, power consumption by the power supply circuit unit, or enlargement of the overall device.

The present invention was devised in view of the foregoing points, and proposes a daisy chain connection system and a system control method which enable, in a system where a plurality of enclosures (information equipment) are connected in a daisy chain, power supply control of the respective daisy chain-connected enclosures (information equipment) without having to add a dedicated power supply control device.

Means to Solve the Problems

In order to achieve the foregoing object, the present invention provides the following daisy chain connection system in which a first information equipment controls a plurality of second information equipment wire-connected in a daisy chain. In this daisy chain connection system, the second information equipment comprises a control unit which performs information processing control in its own information equipment, and a power supply unit which performs power supply control of feeding externally supplied power to its own information equipment. The first information equipment and the control unit of the second information equipment include a communication circuit capable of wired communication using the wired connection, and the first information equipment and the power supply unit of the second information equipment include a wireless circuit capable of mutual wireless communication based on wireless connection. When turning OFF a power supply to any one of the second information equipment, the first information equipment requests the power supply unit of the second information equipment to stop the power supply by using the wireless communication, and the power supply unit performs control for stopping the power supply to the control unit according to the request.

Moreover, in order to achieve the foregoing object, the present invention additionally provides the following system control method in a daisy chain connection system in which a first information equipment controls a plurality of second information equipment wire-connected in a daisy chain. Here, in the daisy chain connection system, the second information equipment includes a control unit which performs information processing control in its own information equipment, and a power supply unit which performs power supply control of feeding externally supplied power to its own information equipment. The first information equipment and the control unit of the second information equipment include a communication circuit capable of wired communication using the wired connection, and the first information equipment and the power supply unit of the second information equipment include a wireless circuit capable of mutual wireless communication based on wireless connection. When turning OFF a power supply to any one of the second information equipment, the system control method comprises a power supply stop request step of the first information equipment requesting the power supply unit of the second information equipment to stop the power supply by using the wireless communication, and a power supply stop implementation step of the power supply unit performing control for stopping the power supply to the control unit according to the request in the power supply stop request step.

Advantageous Effects of the Invention

According to the present invention, in a system where a plurality of information equipment are connected in a daisy chain, it is possible to perform the power supply control of the respective daisy chain-connected information equipment without having to add a dedicated power supply control device.

The foregoing object, configuration and effect will become more apparent based on the explanation of the following embodiments for working the present invention.

BRIEF DESCRIPTION OF DRAWINGS

FIG. 5 is a diagram explaining a data configuration example of the status information.

FIG. 6 is a diagram explaining a data configuration example of the device information.

FIG. 7 is a diagram explaining a data configuration example of the wireless module device information.

FIG. 8 is a flowchart showing the processing routine of the wireless connection initialization.

FIG. 15 is a sequence diagram showing the detailed procedures for turning ON the slave enclosure in FIG. 14.

DESCRIPTION OF EMBODIMENTS

Figure 1:
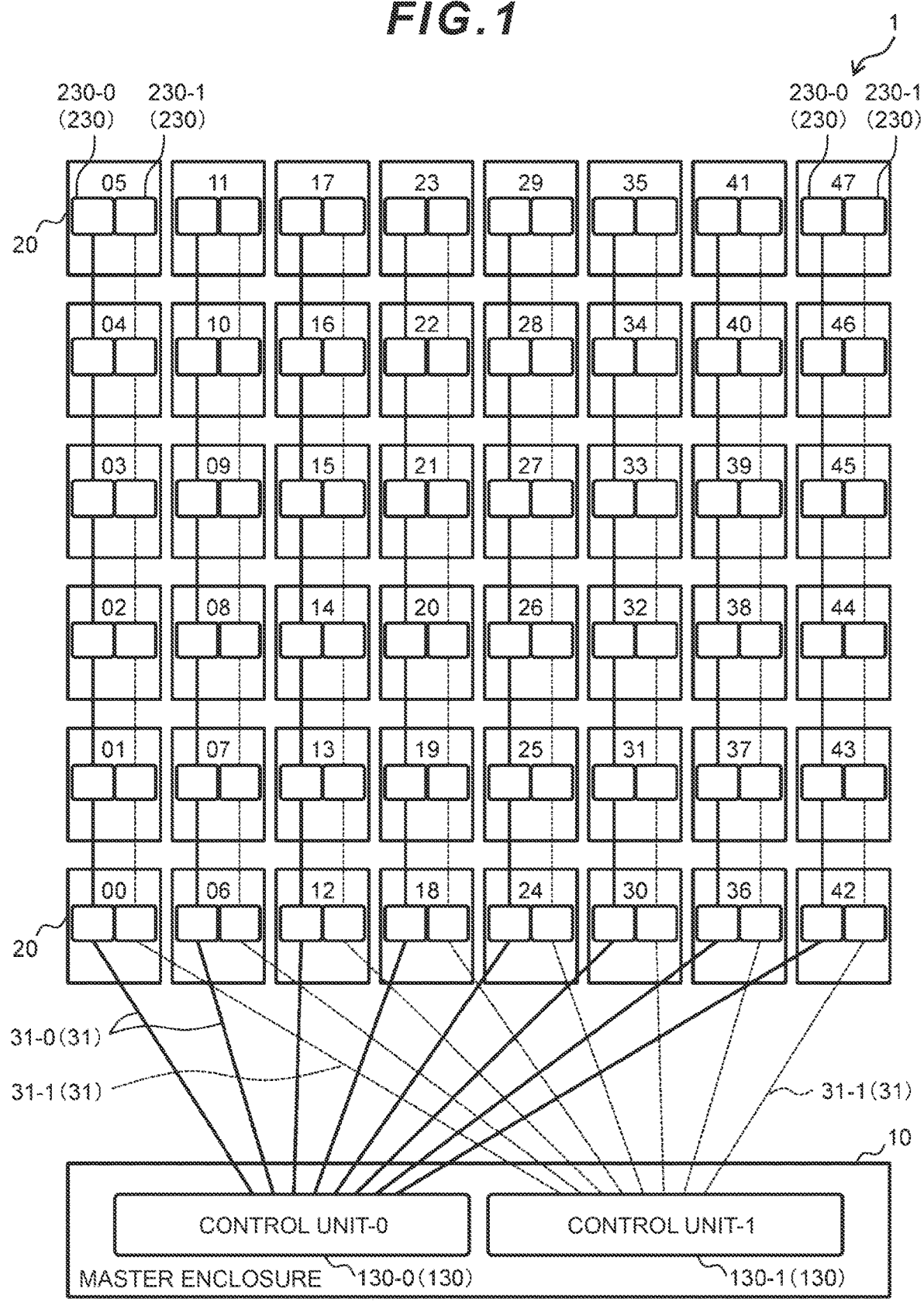
FIG. 1 is a diagram showing an overall configuration example of the daisy chain connection system according to an embodiment of the present invention.

An embodiment of the present invention is now explained with reference to the appended drawings. The following descriptions and appended drawings are examples for explaining the present invention, and have been suitably omitted or simplified for clarifying the explanation. The present invention may also be implemented in various other modes. Unless specifically limited herein, the respective constituent elements may be single or plural.

The position, size, shape and range of the respective constituent elements shown in the appended drawings are indicated for facilitating the understanding of the invention, and may not necessarily represent the actual position, size, shape and range. Thus, the present invention is not necessarily limited to the position, size, shape and range disclosed in the appended drawings.

When various types of information are explained below by using expressions such as "table", "list", or "queue", such various types of information may also be expressed using other data structures. In order to indicate that information is not dependent on a data structure, expressions such as "XX table" and "XX list" may sometimes be referred to as "XX information". Moreover, when expressions such as "identifying information", "identifier", "name", "ID", or "number" are used upon explaining identifying information, these expressions may be mutually substituted.

When there are a plurality of constituent elements having the same or a similar function, there are cases where the explanation will be provided by appending a suffix to the same reference numeral. However, when there is no need to differentiate the plurality of constituent elements, the explanation may be provided by omitting such suffix.

Moreover, in the following explanation, while there are cases where processing, which is performed by executing programs, is explained, because a program performs predetermined processing by suitably using a storage resource (for example, memory) and/or an interface device (for example, communication port) as a result of being executed by a processor (for example, CPU (Central Processing Unit) or GPU (Graphics Processing Unit)), the subject of the processing may also be the processor. Similarly, the subject of the processing to be performed by executing programs may be a controller, a device, a system, a computer, or a node equipped with a processor. The subject of the processing to be performed by executing programs will be sufficient so as long as it is an arithmetic unit, and may include a dedicated circuit (for example, FPGA (Field-Programmable Gate Array) or ASIC (Application Specific Integrated Circuit)) to perform specific processing.

A program may be installed in a device such as a computer from a program source. A program source may be, for example, a program distribution server or a computer-readable storage media. When the program source is a program distribution server, the program distribution server includes a processor and a storage resource which stores the programs to be distributed, and the processor of the program distribution server may distribute the programs to be distributed to another computer. Moreover, in the following explanation, two or more programs may be realized as one program, or one program may be realized as two or more programs.

Note that, in the following explanation, because the term "enclosure" is used as a unit of an outer covering which houses one or more components and devices, the term "enclosure" may be replaced with "equipment" or "information equipment". Specifically, for example, when referring to FIG. 2 and FIG. 3 explained later, the master enclosure 10 and the slave enclosures 20 are "information equipment" comprising the control units 130, 230 to perform information processing control.

(1) Configuration of Daisy Chain Connection System

FIG. 1 is a diagram showing an overall configuration example of the daisy chain connection system according to an embodiment of the present invention. The daisy chain connection system 1 shown in FIG. 1 is configured by comprising a plurality of slave enclosures 20, and one master enclosure 10 which controls the slave enclosures 20. FIG. 1 shows a case where a total of forty-eight (six lines, eight columns) slave enclosures 20 are provided, and six slave enclosures 20 are connected in a daisy chain in each column and form a total of eight slave enclosure groups. The adjacent slave enclosures 20 in each enclosure group are connected via wired cables 31 (individually the wired cables 31-0, 31-1 described later), and the frontmost-enclosure slave enclosure 20 and the master enclosure 10 are also connected via wired cables 31 (wired cables 31-0, 31-1). Note that "00" to "47" indicated in the slave enclosures 20 of FIG. 1 are suffixes appended individually to the slave enclosures 20, and are used as the enclosure name or the enclosure ID described later.

While the details will be explained later, the master enclosure 10 includes a power supply unit 110 (not shown in FIG. 1) which performs power supply control of the slave enclosures 20, and a control unit 130 which performs communication control and information processing control. For example, as the information processing control, the control unit 130 can access the slave enclosures 20 and read and write data according to a command issued from a higher-level device (not shown). Moreover, each slave enclosure 20 includes a power supply unit 210 (not shown in FIG. 1) which performs power supply control of its own enclosure, and a control unit 230 which performs communication control with the master enclosure 10 and adjacent slave enclosures 20, and information processing control in its own enclosure.

With the daisy chain connection system 1 shown in FIG. 1, redundancy (duplication) of control is realized based on a 0-system/1-system. Specifically, the master enclosure 10 comprises a control unit 130-0 (control unit-0) which governs the control of the 0-system, and a control unit 130-1 (control unit-1) which governs the control of the 1-system. The 0-system control unit 130-0 of the master enclosure 10 is connected to a control unit 230-0 of a plurality of slave enclosures 20, which are connected in a daisy chain with a 0-system wired cable 31-0 and controlled by the 0-system, with the same 0-system wired cable 31-0. Moreover, the 1-system control unit 130-1 of the master enclosure 10 is connected to a control unit 230-1 of a plurality of slave enclosures 20, which are connected in a daisy chain with a 1-system wired cable 31-1 and controlled by the 1-system, with the same 1-system wired cable 31-0. As a result of being connected with the wired cables 31-0, 31-1 as described above, the control units 130-0, 130-1 of the master enclosure 10 can separately control the plurality of daisy chain-connected slave enclosures 20 (slave enclosure groups) with the 0-system/1-system.

Figure 2:
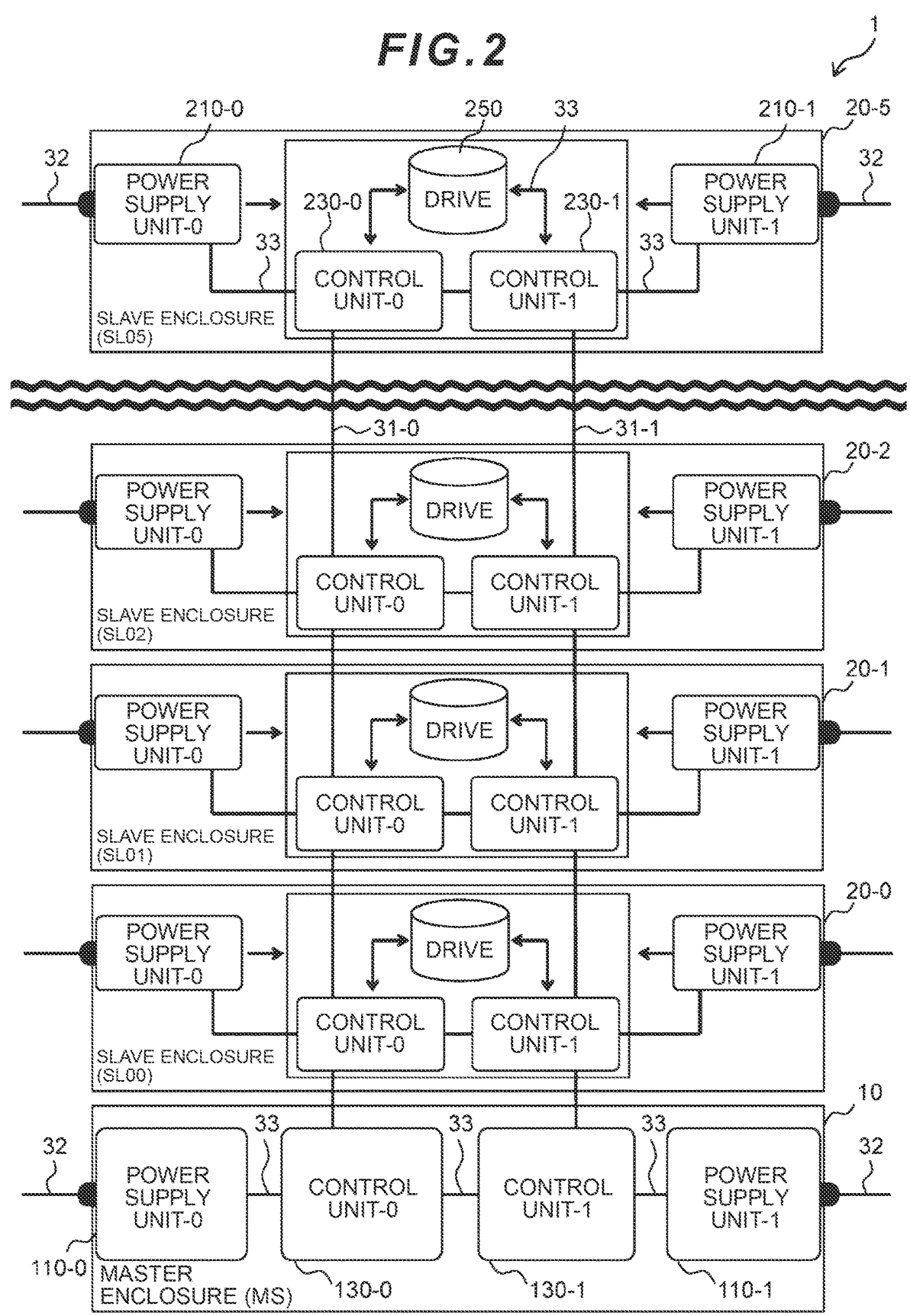
FIG. 2 is a diagram showing a detailed configuration of a part of the daisy chain connection system depicted in FIG. 1.

FIG. 2 is a diagram showing a detailed configuration of a part of the daisy chain connection system depicted in FIG. 1. FIG. 2 shows the detailed configuration of the master enclosure 10 and the slave enclosures 20-0 to 20-5 within the configuration of the daisy chain connection system 1 depicted in FIG. 1. Note that, as explained with reference to FIG. 1, "xx-0" means that it is a configuration of the 0-system, and "xx-1" means that it is a configuration of the 1-system. Moreover, symbols such as "MS" and "SLxx" indicated in the respective enclosures in FIG. 2 are the enclosure ID for uniquely identifying each enclosure (refer to FIG. 6 and FIG. 7).

The master enclosure 10 comprises two power supply units 110-0, 110-1, and two control units 130-0, 130-1, and the respective units are connected as shown in FIG. 2 via an internal bus 33 as the communication path of information. Moreover, a power cable 32 is connected respectively to the power supply units 110-0, 110-1, and, as a result of the power cable 32 being connected to a power source, the power supply units 110-0, 110-1 can respectively receive the power supplied from the power source.

Each slave enclosure 20 (20-0 to 20-5) comprises two power supply units 210-0, 210-1, two control units 230-0, 230-1, and a drive 250 which stores data, and the respective units are connected as shown in FIG. 2 via an internal bus 33 as the communication path of information. Moreover, as with the power supply units 110-0, 110-1 of the master enclosure 10, a power cable 32 is respectively connected to the power supply units 210-0, 210-1, and, as a result of the power cable 32 being connected to a power source, the power supply units 210-0, 210-1 can respectively receive the power supplied from the power source.

As shown in FIG. 2, as a result of the slave enclosures 20-0 to 20-5 being connected in a daisy chain and connected to the respective control units 130 of the master enclosure 10, the control units 130 of the master enclosure 10 can execute the reading and writing of data from and to the drive 250 of an arbitrary slave enclosure 20, and exchange various types of information (device information and status information described later) with the control units 230 of the respective slave enclosures 20. Specifically, for example, when the control unit 130-0 is to write data into the drive 250 of the slave enclosure 20-1 with the 0-system based on a command issued from a higher-level device (for example, a host not shown), by accessing the control unit 230-0 of the slave enclosure 20-1 via the control unit 230-0 of the slave enclosure 20-0 and delivering a write command, the control unit 230-0 of the slave enclosure 20-1 can write data into the drive 250 of its own enclosure. Note that, in the configuration of FIG. 2, while illustrated is a storage device in which the drive 250 is shared by the 0-system and the 1-system, the configuration is not limited thereto, and a different drive 250 may be equipped for each system.

Meanwhile, the configuration of the daisy chain connection system 1 illustrated in FIG. 1 and FIG. 2 is a configuration example for an actual operation, and, in explaining the technology related to the power supply control to the respective slave enclosures 20 based on the present invention, a redundant configuration of the storage device by comprising a plurality of daisy chain-connected slave enclosure groups, or a redundant configuration of control based on the 0-system/1-system, is not a configuration that is necessarily required in the daisy chain connection system 1. Furthermore, the daisy chain connection system 1 will suffice so as long as it is a system in which a plurality of information equipment are connected in a daisy chain, and whether or not it is equipped with the drive 250 does not directly affect the power supply control of the present invention.

In order to simplify the explanation below, going forward, the explanation will be provided using a simple configuration of the daisy chain connection system 1. Specifically, let it be assumed that the daisy chain connection system 1 based on a simple configuration comprises one master enclosure 10, and one daisy chain-connected enclosure group (a plurality of slave enclosures 20), and the master enclosure 10 and the individual slave enclosures 20 respectively include one control unit and one power supply unit.

Figure 3:
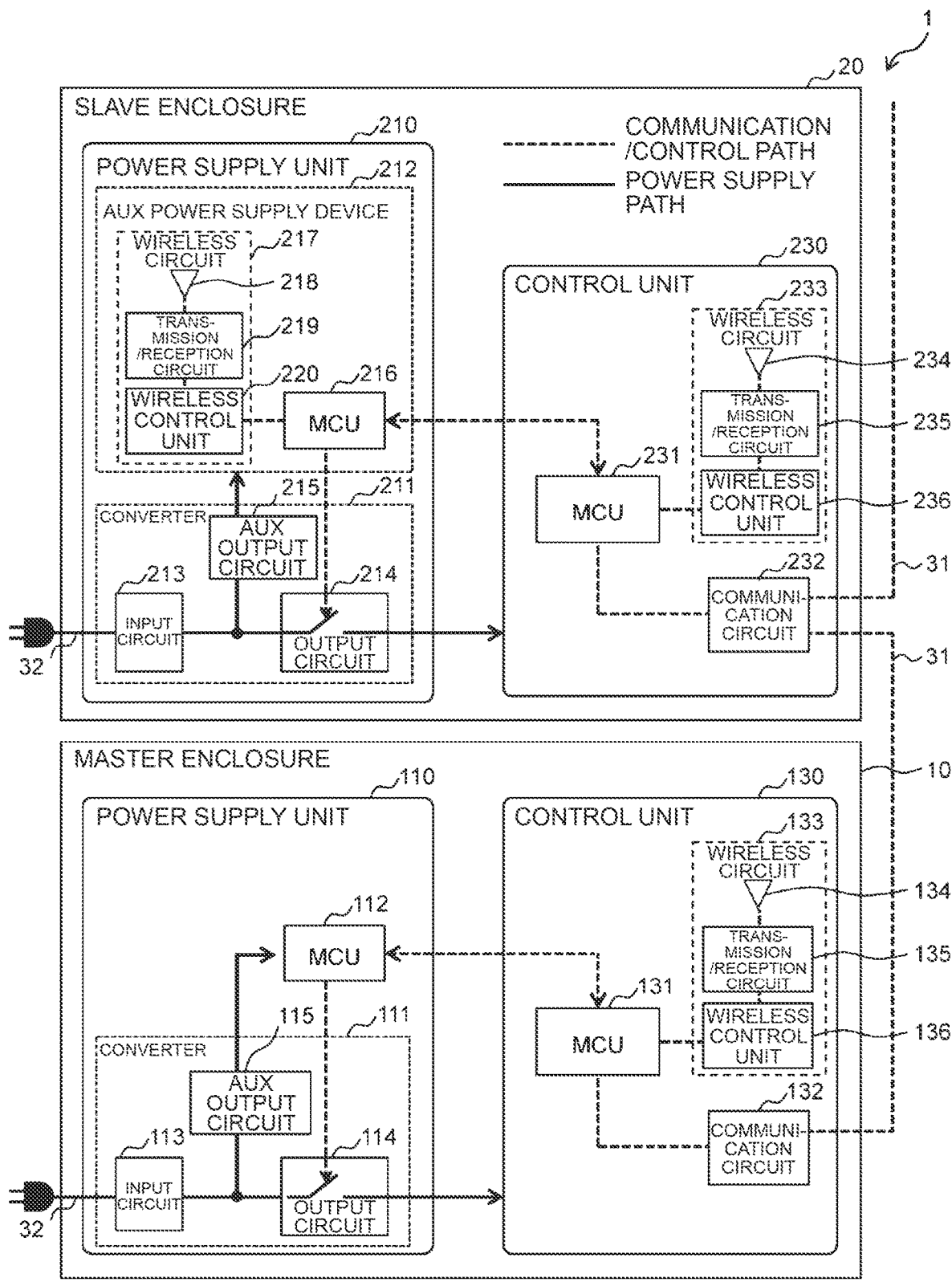
FIG. 3 is a block diagram showing a detailed configuration example of the master enclosure and the slave enclosure.

FIG. 3 is a block diagram showing a detailed configuration example of the master enclosure and the slave enclosure. FIG. 3 illustrates, within the daisy chain connection system 1 based on a simple configuration, the detailed configurations of the master enclosure 10 and the frontmost-enclosure slave enclosure 20 of the daisy chain-connected enclosure group, respectively. Note that, in FIG. 3, the communication path and information control path are shown with a broken line, and the power supply path is shown with a solid line regarding the connection between the respective components.

The detailed configuration of the master enclosure 10 shown in FIG. 3 is foremost explained.

The power supply unit 110 of the master enclosure 10 comprises a converter 111 and an MCU (Micro Controller Unit) 112.

The converter 111 includes an input circuit 113, an output circuit 114, and an AUX output circuit 115. The converter 111 converts (rectifies) the alternate current supplied from the input circuit 113 via the power cable 32 into a direct current, and outputs the converted direct current from the output circuit 114 or the AUX output circuit 115. The AUX output circuit 115 is an auxiliary output circuit of the output circuit 114 disposed in the converter 111, and at least a part of the current (power) rectified by the converter 111 is output to the connection destination (MCU 112 in this example) connected to the AUX output circuit 115.

The MCU 112 is a mounting microprocessor in which a computer system (CPU, RAM, ROM, I/O interface circuit, etc.) is compiled on an integrated circuit, and controls the power supply unit 110. Specifically, for example, the MCU 112 controls the switch status of the output circuit 114 of the converter 111, as well as exchanges control signals and information with the MCU 131 of the control unit 130. When the MCU 112 performs control of closing the switch of the output circuit 114, power supply to the control unit 130 (power supply ON) is performed as a result of the current (power) rectified by the converter 111 being output from the output circuit 114 to the control unit 130. Meanwhile, when the MCU 112 performs control of opening the switch of the output circuit 114, because the output circuit 114 does not output the current (power) rectified by the converter 111 to the control unit 130, the power supply to the control unit 130 is stopped (power supply OFF). All MCUs explained in this embodiment may also be referred to control circuits.

The control unit 130 of the master enclosure 10 comprises an MCU 131, a communication circuit 132, and a wireless circuit 133.

The MCU 131 is a mounting microprocessor in which a computer system (CPU, RAM, ROM, I/O interface circuit, etc.) is compiled on an integrated circuit, and controls the control unit 130 by performing the control of information processing, such as computation and storage, and communication. Specifically, for example, the MCU 131 performs various types of information processing based on the exchange of control signals and information with the MCU 112, as well as performs the control of wired communication by the communication circuit 132 and the control of wireless communication by the wireless circuit 133.

The communication circuit 132 is a circuit which performs the transmission/reception of wired communication via the wired cable 31. Specifically, the communication circuit 132 of the control unit 130 of the master enclosure 10 can perform wired communication, via the wired cable 31, with the connection destination of the wired cable 31; that is, the communication circuit 232 of the control unit 230 of the frontmost-enclosure slave enclosure 20 in the daisy chain connection.

The wireless circuit 133 is a circuit which performs the transmission/reception of wireless communication with external devices (for example, control unit 230 of each of the daisy chain-connected slave enclosures 20) via an antenna 134. The wireless circuit 133 includes an antenna 134 which performs the transmission/reception of radio wave signals, a transmission/reception circuit 135 which performs the modulation and demodulation of radio wave signals and digital signals, and a wireless control unit 136 which performs control of the overall wireless communication (designation of destination, identification of source, determination of transmission timing, etc.).

The detailed configuration of the slave enclosures 20 shown in FIG. 3 is now explained. Note that the detailed configuration of the slave enclosures 20 is similar to the detailed configuration of the master enclosure 10 described above in many ways, and the detailed explanation of any configuration having the same function will be omitted.

The power supply unit 210 of the slave enclosures 20 comprises a converter 211 and an AUX power supply device 212.

The converter 211 includes an input circuit 213, an output circuit 214, and an AUX output circuit 215. The converter 211 convers (rectifies) the alternate current supplied from the input circuit 213 via the power cable 32 into a direct current, and outputs the converted direct current from the output circuit 214 or the AUX output circuit 215. Note that, as a point that is different from the AUX output circuit 115 of the master enclosure 10, the connection destination of the AUX output circuit 215 is the AUX power supply device 212.

The AUX power supply device 212 is a device (or a substrate) configured by a wireless communication circuit (wireless circuit 217) being added to a mounting microprocessor (MCU 216), and is connected to the AUX output circuit 215 of the converter 211.

The MCU 216 is a mounting microprocessor in which a computer system (CPU, RAM, ROM, I/O interface circuit, etc.) is compiled on an integrated circuit, and controls the power supply unit 210. The MCU 216 controls the switch of the output circuit 214 of the converter 211. Specifically, when the MCU 216 performs control of closing the switch of the output circuit 214, power supply to the control unit 230 (power supply ON) is performed as a result of the current (power) rectified by the converter 211 being output from the output circuit 214 to the control unit 230. Meanwhile, when the MCU 216 performs control of opening the switch of the output circuit 214, because the output circuit 214 does not output the current (power) rectified by the converter 211 to the control unit 230, the power supply to the control unit 230 is stopped (power supply OFF). Otherwise, the MCU 216 exchanges control signals and information with the MCU 231 of the control unit 230, and controls the wireless communication by the wireless circuit 217.

The wireless circuit 217 is a circuit which performs the transmission/reception of wireless communication with external devices via an antenna 218, and includes an antenna 218, a transmission/reception circuit 219, and a wireless control unit 220. Because the functions of the respective components of the wireless circuit 217 are the same as the respective components of the wireless circuit 133 explained with reference to the control unit 130 of the master enclosure 10 excluding the point that the connection destination of the wireless control unit 220 is the MCU 216, the detailed explanation thereof is omitted.

The control unit 230 of the slave enclosure 20 comprises an MCU 231, a communication circuit 232, and a wireless circuit 233, and the wireless circuit 233 includes an antenna 234, a transmission/reception circuit 235, and a wireless control unit 236. Because the functions of the respective components in the control unit 230 are the same as the control unit 130 of the master enclosure 10, the detailed explanation thereof is omitted.

Note that, while FIG. 3 illustrated the frontmost-enclosure slave enclosure 20, the detailed configuration of the other daisy chain-connected slave enclosures 20 is basically the same other than the connection destination by the wired cable 31 being the adjacent slave enclosure 20.

(2) Data Configuration

Figure 4:
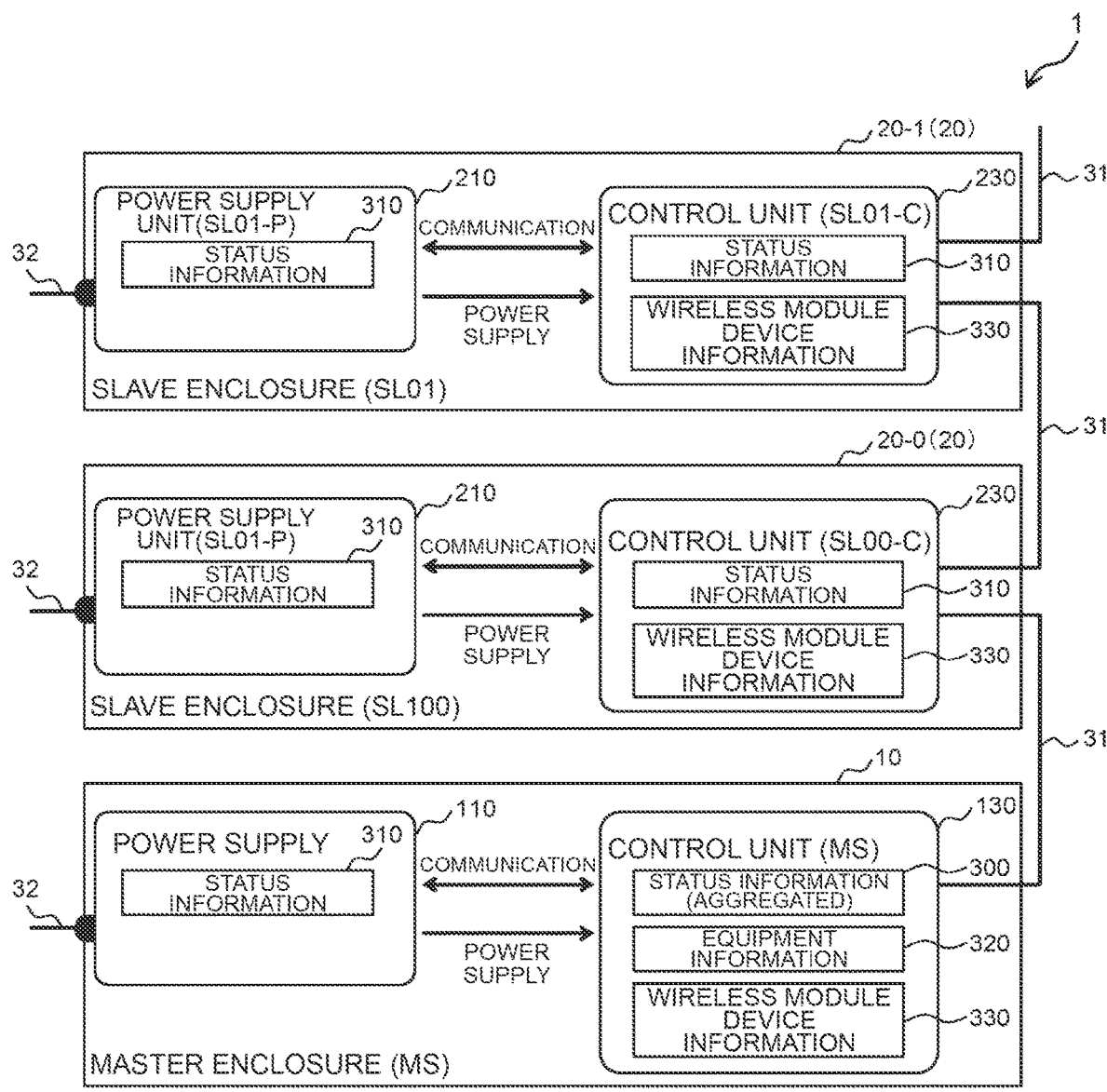
FIG. 4 is a diagram explaining the relationship between units.

FIG. 4 is a diagram explaining the relationship between units. FIG. 4 shows the power supply path and the communication path using the wired connection in the daisy chain connection system 1 according to this embodiment, as well as the information (data) that is exchanged between the respective units. Symbols such as "SL00-P" and "SL01-C" indicated in the respective units in FIG. 4 are the device ID for uniquely identifying each unit (refer to FIG. 5 and FIG. 6).

The power supply path is foremost explained. As shown in FIG. 4, in the master enclosure 10, the power supply is performed from the power supply unit 110 to the control unit 130. Similarly, in the respective slave enclosures 20, the power supply is performed from the power supply unit 210 to the control unit 230. Moreover, while the details will be explained later, in this embodiment, by leveraging the fact that the control unit 130 of the master enclosure 10 and the power supply unit 210 of the respective slave enclosures 20 respectively include the wireless circuits 133, 217, the control unit 130 of the master enclosure 10 can control the power supply to the respective slave enclosures 20 (power source OFF/ON of the control unit 230) via wireless communication.

The communication path is now explained. As shown in FIG. 4, in the master enclosure 10, a mutual communication path is established between the power supply unit 110 and the control unit 130, and, similarly, in the slave enclosures 20, a mutual communication path is established between the power supply unit 210 and the control unit 230. Furthermore, as a result of the control units being connected via the wired cable 31 between adjacent enclosures such as between the master enclosure 10 and the slave enclosure 20-0 and between the slave enclosure 20-0 and the slave enclosure 20-1, a communication path between the enclosures is established. However, because the slave enclosures 20 are connected in a daisy chain, when the power supply to the preceding-enclosure control unit 230 is stopped, the control unit 130 of the master enclosure 10 will not be able to engage in a wired communication with the subsequent-enclosure control unit 230. While the details will be explained later, to deal with this problem, in this embodiment, by leveraging the fact that the control unit 130 of the master enclosure 10 and the control unit 230 of the respective slave enclosures 20 respectively include the wireless circuits 133, 233, even when the power source of a slave enclosure 20 in the middle is turned OFF, the control unit 130 of the master enclosure 10 and the control unit 230 of the subsequent-enclosure slave enclosures 20 are able to perform the transmission/reception of information via wireless communication.

The information retained in the respective units shown in FIG. 4 is now explained. The information retained in the respective unit is stored, for example, in the storage medium in the MCU of its own unit.

According to FIG. 4, in the master enclosure 10, the power supply unit 110 retains status information 310, and the control unit 130 retains status information 300, device information 320, and wireless module device information 330. Moreover, in the slave enclosures 20, the power supply unit 210 retains status information 310, and the control unit 230 retains status information 310 and wireless module device information 330.

The status information 310 is data related to the various types of status in its own unit (or own enclosure). The information items to be recorded in the status information 310 may be arbitrarily set in advance, and, specifically, for example, in addition to unique information such as the product number (production number) of its own unit, it is also possible to record dynamic information such as the failure state, operating state, or status of output control. However, the status information 310 used in this embodiment needs to be information of a relatively small data size to enable the transmission/reception thereof with the wireless circuits 133, 217, 233 of the respective units.

The status information 300 is data obtained by aggregating the status information 310 of the respective units and, to put it differently, is information obtained by aggregating the status of all enclosures and units configuring the daisy chain connection system 1. The MCU 131 of the control unit 130 of the master enclosure 10 can comprehend the unique information and failure state of the constituent elements across the overall daisy chain connection system 1 as a result of retaining such aggregated status information 300. The method of the MCU 131 of the control unit 130 of the master enclosure 10 collecting the status information 300 from the respective units (power supply unit 210, control unit 230) of the respective slave enclosures 20 will be explained later with reference to FIG. 10 and FIG. 11.

Note that, in FIG. 4, while only the control unit 130 of the master enclosure 10 retains the status information 300, this embodiment is not limited thereto, and, for example, as a result of the control unit 130 sending the aggregated status information 300 to the respective units, the same information as the status information 300 may also be retained as the status information 310 of the respective units.

FIG. 5 is a diagram explaining a data configuration example of the status information. FIG. 5 shows a part of the data example when the status information 300 (310) is to be retained in a table format.

Specifically, in the case of FIG. 5, the status information 300 (310) is configured from a module column 301 which indicates the functional type of the target unit, a device ID column 302 which indicates the device ID as the identifier of the target unit, a memory address column 303 which indicates the memory address that is assigned for storing predetermined information in the memory of the target unit (memory in the MCU in this example), and a remarks column 304 which indicates the details of the information stored in the foregoing memory address. Note that the contents of the module column 301 and the device ID column 302 correspond to the contents of the module column 332 and the device ID column 334 of the wireless module device information 330 described later with reference to FIG. 7.

The device information 320 is data related to the respective equipment (master enclosure 10, slave enclosures 20) connected to the daisy chain connection system 1. The MCU 131 of the control unit 130 of the master enclosure 10 can comprehend the connection configuration of the equipment (enclosures) in the daisy chain connection system 1 by retaining the device information 320 as an aggregate of the device information of the respective equipment.

FIG. 6 is a diagram explaining a data configuration example of the device information. FIG. 6 shows a part of the data example when the device information 320 is to be retained in a table format.

Specifically, in the case of FIG. 6, the device information 320 is configured from a No. column 321 which indicates the serial number of the equipment (enclosure), an enclosure name column 322 which indicates the name assigned to the foregoing equipment in the system, a type column 323 which indicates the role type (master/slave) in the control of the foregoing equipment, and an enclosure ID column 324 which indicates the enclosure ID as the identifier of the foregoing equipment. Note that the information items to be recorded in the device information 320 are not limited to the examples of FIG. 6, and, for example, the product number of the enclosure and the unit may also be recorded.

The wireless module device information 330 is data related to the devices capable of wireless communication (corresponding to the respective units including the wireless circuits 133, 217, 233 in this example) in the daisy chain connection system 1. As shown in FIG. 4, with the daisy chain connection system 1 according to this embodiment, in the least the MCUs 131, 231 of the control units 130, 230 of the respective enclosures retain the wireless module device information 330. Note that, in the slave enclosure 20, while the power supply unit 210 is also a device capable of wireless communication as a result of including the wireless circuit 217, because the MCU 216 of the power supply unit 210 is able to share the wireless module device information 330, via the internal bus 33, from the MCU 231 of the control unit 230 of the same slave enclosure 20, the power supply unit 210 does not necessarily need to retain the wireless module device information 330. As a result of retaining the wireless module device information 330 in the respective enclosures, it becomes possible to send and receive the network ID between units of each enclosure within the daisy chain connection system 1, and the establishment and implementation of wireless communication are thereby enabled. Moreover, while not shown in FIG. 6, the wireless module device information 330 may also retain the network ID capable of identifying the wireless network to which each module belongs in order to identify the wireless network in other systems; more specifically, so that it is possible to identify that it is a module (control unit 230, power supply unit 210) capable of wireless communication via the wireless network including the control unit 130 of the master enclosure 10.

FIG. 7 is a diagram explaining a data configuration example of the wireless module device information. FIG. 7 shows a part of the data example when the wireless module device information 330 is to be retained in a table format.

Specifically, in the case of FIG. 7, the wireless module device information 330 is configured from an enclosure ID column 331 which indicates the enclosure ID as the identifier of the enclosure, a module column 332 which indicates the functional type of the unit having the wireless communication function (wireless circuit) in that enclosure, a device type column 333 which indicates the role type (master/slave) in the control of the foregoing unit, and a device ID column 334 which indicates the device ID as the identifier of the foregoing unit. Note that the descriptions of the enclosure ID column 331 correspond to the enclosure ID column 324 of the device information 320 shown in FIG. 6.

(3) Various Types of Processing

The processes and procedures executed in relation to the power supply control of the slave enclosures 20 in the daisy chain connection system 1 according to this embodiment are now explained in detail. Note that, in the following explanation, the indication of the MCUs and the wireless circuits may be simplified as follows. For example, the MCU 131 of the control unit 130 may be indicated as "control-MCU 131", and the wireless circuit 217 of the power supply unit 210 may be indicated as "power-wireless circuit 217".

(3-1) Initialization of Wireless Connection

In the power supply control of the slave enclosures 20 (slave enclosure OFF processing, slave enclosure ON processing) according to this embodiment, wireless communication between the enclosures is used in certain processes. Thus, the initialization of the wireless connection required for the wireless communication between the master enclosure 10 and the slave enclosure 20 is foremost explained.

FIG. 8 is a flowchart showing the processing routine of the wireless connection initialization. FIG. 8 shows the processing performed by the control unit 130 of the master enclosure 10 for initializing the wireless communication with the power supply unit 210 or the control unit 230 of the slave enclosure 20.

According to FIG. 8, foremost, the control-MCU 131 of the master enclosure 10 confirms whether wireless communication can be connected between the wireless circuit 133 of its own unit and the power-wireless circuit 217 (or control-wireless circuit 233) of the slave enclosure 20 (step S11). The wireless module device information 330 is used upon attempting wireless connection. When the wireless connection was established in step S11 (step S11: YES), the processing proceeds to step S12, and when the wireless connection was unsuccessful (step S11: NO), the processing proceeds to step S15.

In step S12, the control-MCU 131 of the master enclosure 10 uses the wireless communication confirmed in step S11 and requests and acquires the device information of the unit (power supply unit 210, control unit 230) of the wireless connection destination. The device information requested here is, for example, the information included in the device information 320 explained with reference to FIG. 6 and, more specifically, is the product number (production number) of the corresponding unit.

Next, the control-MCU 131 of the master enclosure 10 uses the wired communication via the wired cable 31 and, in the same manner as step S12, requests and acquires the device information of the unit of the connection destination (step S13). Note that the execution order of step S12 and step S13 may be switched.

Subsequently, the control-MCU 131 of the master enclosure 10 compares the device information acquired in step S12 and the device information acquired in step S13, and determines whether the mutual information is a match (step S14). When the information is a match in step S14 (step S14: YES), the control-MCU 131 of the master enclosure 10 determines that a normal wireless connection has been established with the unit of the connection destination, and normally ends the initialization of the wireless connection. Meanwhile, when the information is not a match in step S14 (step S14: NO), the control-MCU 131 of the master enclosure 10 determines that the establishment of a normal wireless connection was unsuccessful, and proceeds to step S15.

Step S15 is executed when the wireless connection was unsuccessful (step S11: NO), or the establishment of a normal wireless connection was unsuccessful (step S14: NO). Here, the control-MCU 131 of the master enclosure 10 performs predetermined error processing such as outputting an error message, and thereafter abnormally ends the initialization of the wireless connection. Note that, in step S15, it is also possible to re-execute (retry) the immediately preceding processing that was unsuccessful, and perform error processing when the retry was unsuccessful a predetermined number of times.

Figure 9:
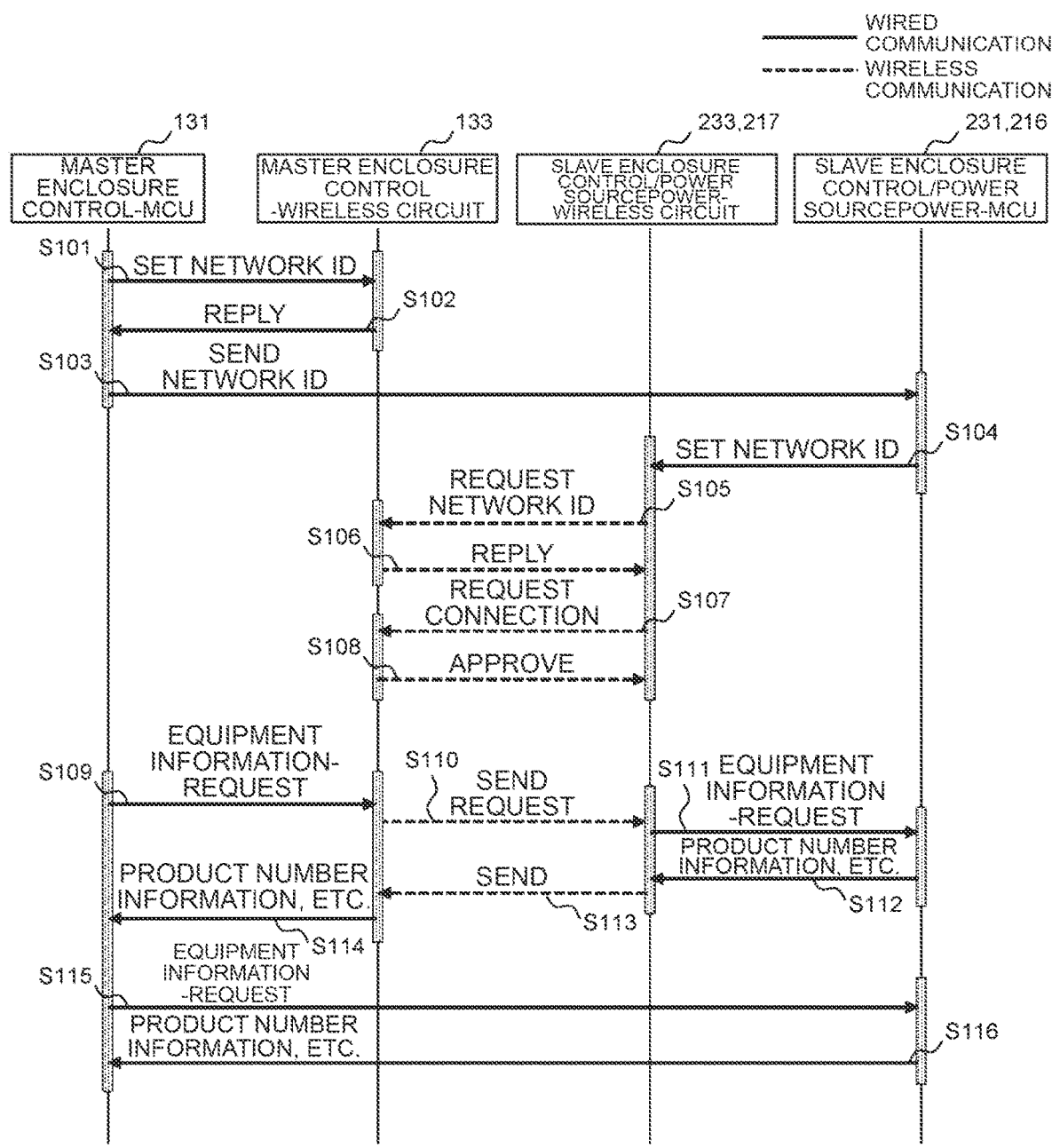
FIG. 9 is a sequence diagram showing the detailed procedures in the wireless connection initialization of FIG. 8.

FIG. 9 is a sequence diagram showing the detailed procedures in the wireless connection initialization of FIG. 8. Specifically, the procedures of steps S101 to S108 of FIG. 9 correspond to the processing of step S11 of FIG. 8, the procedures of steps S109 to S114 of FIG. 9 correspond to the processing of step S12 of FIG. 8, and the procedures of steps S115 to S116 of FIG. 9 correspond to the processing of step S13 of FIG. 8.

Foremost, when attempting wireless connection (step S11), in the control unit 130 of the master enclosure 10, the MCU 131 requests the wireless circuit 133 to set a network ID based on wired communication via the internal bus 33 (step S101), and the wireless circuit 133 that received the request returns the network ID to the MCU 131 (step S102).

Next, the control-MCU 131 of the master enclosure 10 sends the network ID acquired in step S102, based on wired communication via the wired cable 31 and the internal bus 33, to the MCU of the unit with which a wireless connection is to be established; that is, the power-MCU 216 (or control-MCU 231) of the slave enclosure 20 (step S103). The power-MCU 216 (or control-MCU 231) that received the sent network ID requests, based on wired communication via the internal bus 33, the wireless circuit 217 (or wireless circuit 233) of its own unit to set a network ID (step S104).

Next, the wireless circuit 217 (or wireless circuit 233) that received the request in step S104 performs, via wireless communication, the procedures of requesting and replying the network ID (steps S105, S106) and the procedures of requesting and approving connection using the network ID (steps S107, S108) with the control-wireless circuit 133 of the master enclosure 10.

When the procedures of steps S101 to S108 have ended normally, it is determined that a wireless connection has been established (step S11 of FIG. 8: YES), and, when the procedures did not end normally in any of steps S101 to S108, it is determined that a wireless connection could not be established (step S11 of FIG. 8: NO).

Next, when acquiring the product number and other information of the unit of the wireless connection destination via wireless communication (step S12), the control-MCU 131 of the master enclosure 10 requests, via wireless communication, the device information of the unit (for example, power supply unit 210 of the slave enclosure 20) of the wireless connection destination. Specifically, this request for the device information is sent from the wireless circuit 133 of its own unit to the wireless circuit 217 of the power supply unit 210 via wireless communication, and then forwarded to the MCU 216 of the power supply unit 210 (steps S109 to S111).

Subsequently, the MCU 216 that received this request for the device information sends the device information, such as the product number information retained in its own memory, to the control-MCU 131 of the master enclosure 10 with a path using the wireless communication which is reversed from steps S109 to S111 (steps S112 to S114).

As a result of the foregoing procedures of steps S109 to S114 being executed, the control-MCU 131 of the master enclosure 10 can acquire the product number and other information of the unit of the wireless connection destination via wireless communication.

Next, when acquiring the product number and other information of the unit of the wireless connection destination via wired communication (step S13), the control-MCU 131 of the master enclosure 10 requests, via wired communication, the device information of the unit (for example, power supply unit 210 of the slave enclosure 20) of the wireless connection destination. Specifically, this request for the device information is sent to the MCU 216 of the power supply unit 210 via the internal bus 33 and the wired cable 31 (step S115).

Subsequently, the MCU 216 that received this request for the device information sends the device information, such as the production number information retained in its own memory, to the control-MCU 131 of the master enclosure 10 with a path using the same wired communication as step S115 (step S116).

As a result of the foregoing procedures of steps S115 to S116 being executed, the control-MCU 131 of the master enclosure 10 can acquire the product number and other information of the unit of the wireless connection destination via wired communication. Consequently, the control-MCU 131 of the master enclosure 10 can make the determination of step S14 of FIG. 8 by comparing the information via wireless communication acquired in steps S109 to S114 and the information via wired communication acquired in steps S115 to S116, and, when the information is a match, a normal wireless connection can be established.

(3-2) Collection of Status Information

With the daisy chain connection system 1 according to this embodiment, as a result of the respective units of the respective enclosures being equipped with a wireless circuit, even when the power supply of certain daisy chain-connected slave enclosures 20 is stopped (power source of the control unit 230 is turned OFF) due to the implementation of the power saving function or other reasons, the master enclosure 10 can use wireless communication and collect the status information 310 from an arbitrary slave enclosure 20 on the subsequent-enclosure side of the daisy chain connection.

Figure 10:
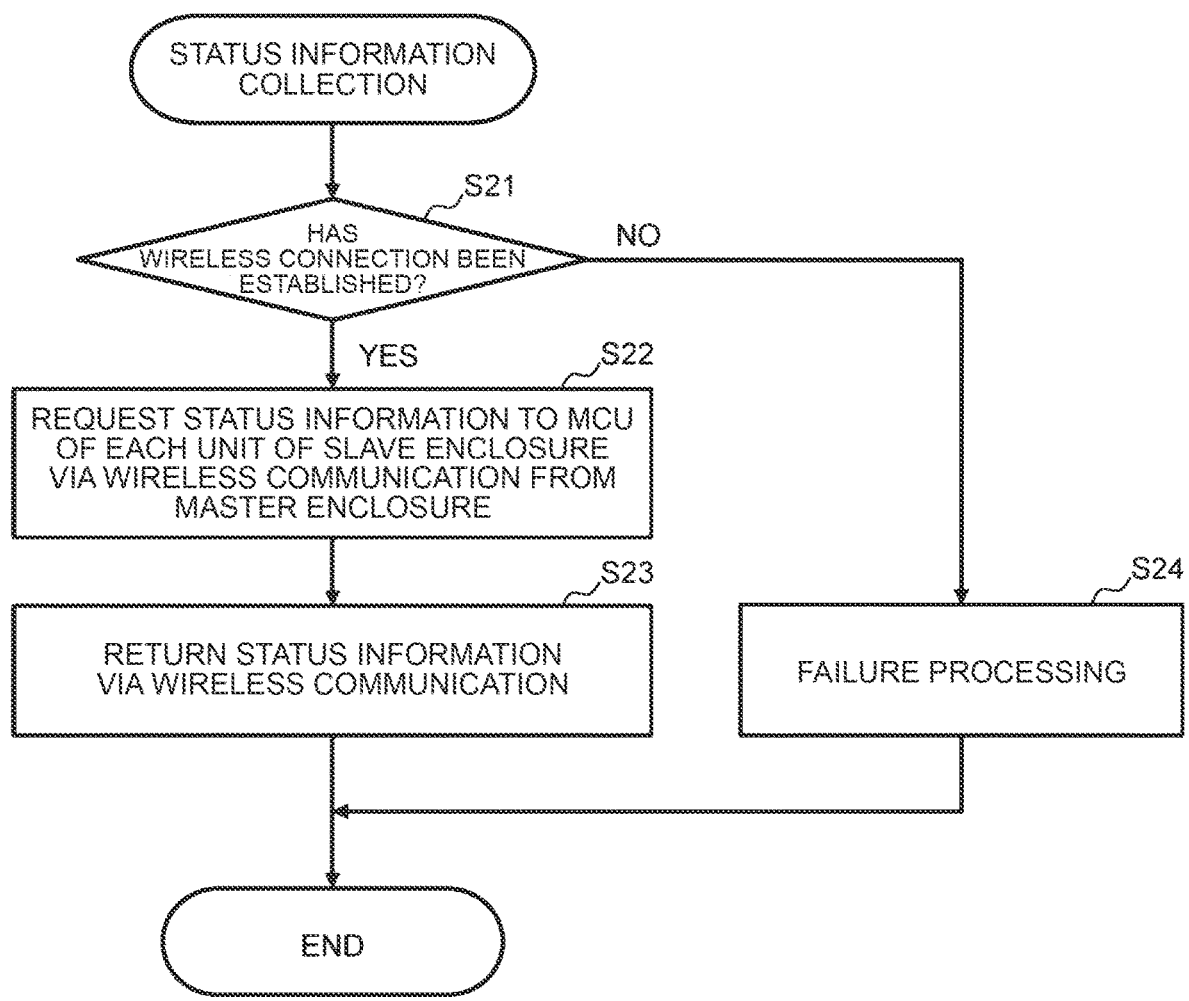
FIG. 10 is a flowchart showing the processing routine of the status information collection.

FIG. 10 is a flowchart showing the processing routine of the status information collection. FIG. 10 shows the processing performed by the control-MCU 131 of the master enclosure 10 of using wireless communication and collecting the status information 310 from the power supply unit 210 or the control unit 230 of the slave enclosure 20.

According to FIG. 10, foremost, the control-MCU 131 of the master enclosure 10 confirms whether a normal wireless connection has been established between the wireless circuit 133 of its own unit and the power-wireless circuit 217 (or control-wireless circuit 233) of the slave enclosure 20 (step S21). When the establishment of a normal wireless connection is confirmed in step S21 (step S21: YES), the processing proceeds to step S22, and when the establishment of a normal wireless connection could not be confirmed (step S21: NO), the processing proceeds to step S24.

In step S22, the control-MCU 131 of the master enclosure 10 uses the wireless communication confirmed in step S21 and requests the MCUs 216, 231 of the respective units of the slave enclosure 20 of the wireless connection destination to send the status information 310 that they are respectively retaining. Subsequently, upon receiving the request of step S22, the respective MCUs 216, 231 return the status information 310 that they are retaining to the control-MCU 131 of the master enclosure 10 via wireless communication (step S23).

As a result of the foregoing processing of steps S21 to S23 being performed, because the control-MCU 131 of the master enclosure 10 can collect the status information 310 from the respective units of the slave enclosure 20 that is wirelessly connected, it can thereby aggregate such status information 310 and generate/update its own status information 300. Because the foregoing processing of steps S21 to S23 can be executed without using the wired cable 31, even when the power supply is stopped in a slave enclosure 20 in the middle of the daisy chain connection, the status information 310 can be collected from the slave enclosures 20 of the subsequent-enclosure onward without being influenced by such stoppage of power supply.

Meanwhile, when the establishment of a normal wireless connection could not be confirmed in step S21 and the processing proceeds to step S24, because the status information 310 cannot be collected from the respective units of the slave enclosure 20 of the connection destination, the control-MCU 131 of the master enclosure 10 performs predetermined error processing such as outputting an error message, and thereafter ends the collection of the status information 310. Note that, in step S24, the foregoing error processing may be performed after the processing is retried a predetermined number of times, or the status information 310 may be collected from the respective units of another slave enclosure 20 in which the establishment of a wireless connection was confirmed.

Figure 11:
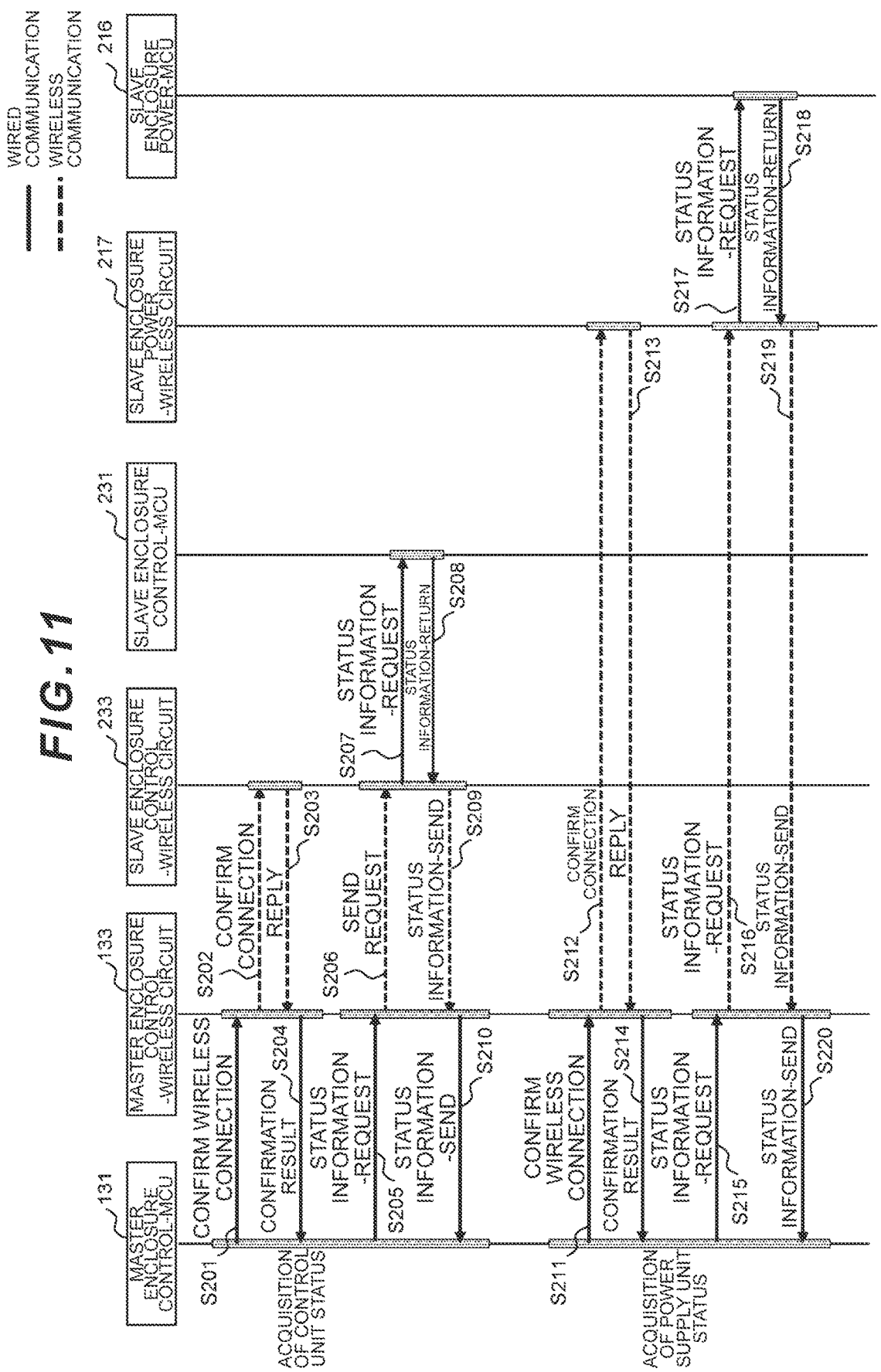
FIG. 11 is a sequence diagram showing the detailed procedures in the status information collection of FIG. 10.

FIG. 11 is a sequence diagram showing the detailed procedures in the status information collection of FIG. 10. In FIG. 11, steps S201 to S210 show the procedures of the control-MCU 131 of the master enclosure 10 acquiring the status information 310 from the control unit 230 (MCU 231) of the slave enclosure 20, and steps S211 to S220 show the procedures of the control-MCU 131 of the master enclosure 10 acquiring the status information 310 from the power supply unit 210 (MCU 216) of the slave enclosure 20.

Moreover, the correspondence relationship of the procedures of FIG. 11 and the processing of FIG. 10 will be as follows. The procedures of steps S201 to S204 and steps S211 to S214 of FIG. 11 correspond to the processing of step S21 of FIG. 10, the procedures of steps S205 to 207 and steps S215 to S217 of FIG. 11 correspond to the processing of step S22 of FIG. 10, and the procedures of steps S208 to S210 and steps S218 to S220 of FIG. 11 correspond to the processing of step S23 of FIG. 10.

Because the procedures of steps S201 to S210 and the procedures of steps S211 to S220 are the same other than the connection destination via wireless communication, only the procedures of steps S201 to S210 will be explained in detail below.

According to FIG. 11, foremost, in the control unit 130 of the master enclosure 10, the MCU 131 requests the wireless circuit 133 of its own unit to confirm a wireless connection based on wired communication via the internal bus 33 (step S201). The control-wireless circuit 133 that received the request of step S201 requests the control-wireless circuit 233 of the slave enclosure 20, via wireless communication, to confirm the wireless connection (step S202).

When the control-wireless circuit 233 returns a reply via wireless communication in response to the connection confirmation request of step S202 (step S203), the control-wireless circuit 133 sends to the MCU 131 a confirmation result to the effect that the establishment of a normal wireless connection was confirmed (step S204). Note that, when a reply is not returned from the control-wireless circuit 233 in step S203 even after the lapse of a given period, in step S204, the control-wireless circuit 133 sends to the MCU 131 a confirmation result to the effect that the establishment of a normal wireless connection could not be confirmed.

Next, the control-MCU 131 of the master enclosure 10 requests, via wireless communication, the status information of the connection destination (in this example, control unit 230 of the slave enclosure 20) in which a normal wireless connection was confirmed in steps S201 to S204. Specifically, this request for the status information is sent from the wireless circuit 133 of its own unit to the control-wireless circuit 233 via wireless communication, and then forwarded to the control-MCU 231 of the slave enclosure 20 (steps S205 to S207).

Subsequently, the control-MCU 231 of the slave enclosure 20 that received the request for the status information sends the status information 310 retained in its own memory to the control-MCU 131 of the master enclosure 10 with a path using the wireless communication that is reversed from steps S205 to S207 (steps S208 to S210).

As a result of the foregoing procedures of steps S201 to S210 being executed, the control-MCU 131 of the master enclosure 10 can acquire the status information 310 retained by the MCU 231 from the control unit 230 of the slave enclosure 20, in which the establishment of the wireless connection was confirmed, via wireless communication. Similarly, as a result of the procedures of steps S211 to S220 being executed, the control-MCU 131 of the master enclosure 10 can acquire the status information 310 retained by the MCU 216 from the power supply unit 210 of the slave enclosure 20, in which the establishment of the wireless connection was confirmed, via wireless communication.

Acquisition of the status information 310 from the slave enclosure 20 as described above in this embodiment can be implemented irrespective of the power supply status of the other daisy chain-connected slave enclosures 20 (to put it differently, without being affected by the connection status of the wired communication between the slave enclosures 20 via the wired cable 31). Consequently, the daisy chain connection system 1 according to this embodiment can be expected to exhibit improved serviceability and reliability.

(3-3) Slave Enclosure OFF

With the daisy chain connection system 1 according to this embodiment, the master enclosure 10 can control the power supply (OFF/ON) of the respective slave enclosures 20 without having to add a dedicated power supply control device. The process of "slave enclosure OFF" of the master enclosure 10 stopping the power supply to the slave enclosure 20 (more specifically, control unit 230) is foremost explained below.

Figure 12:
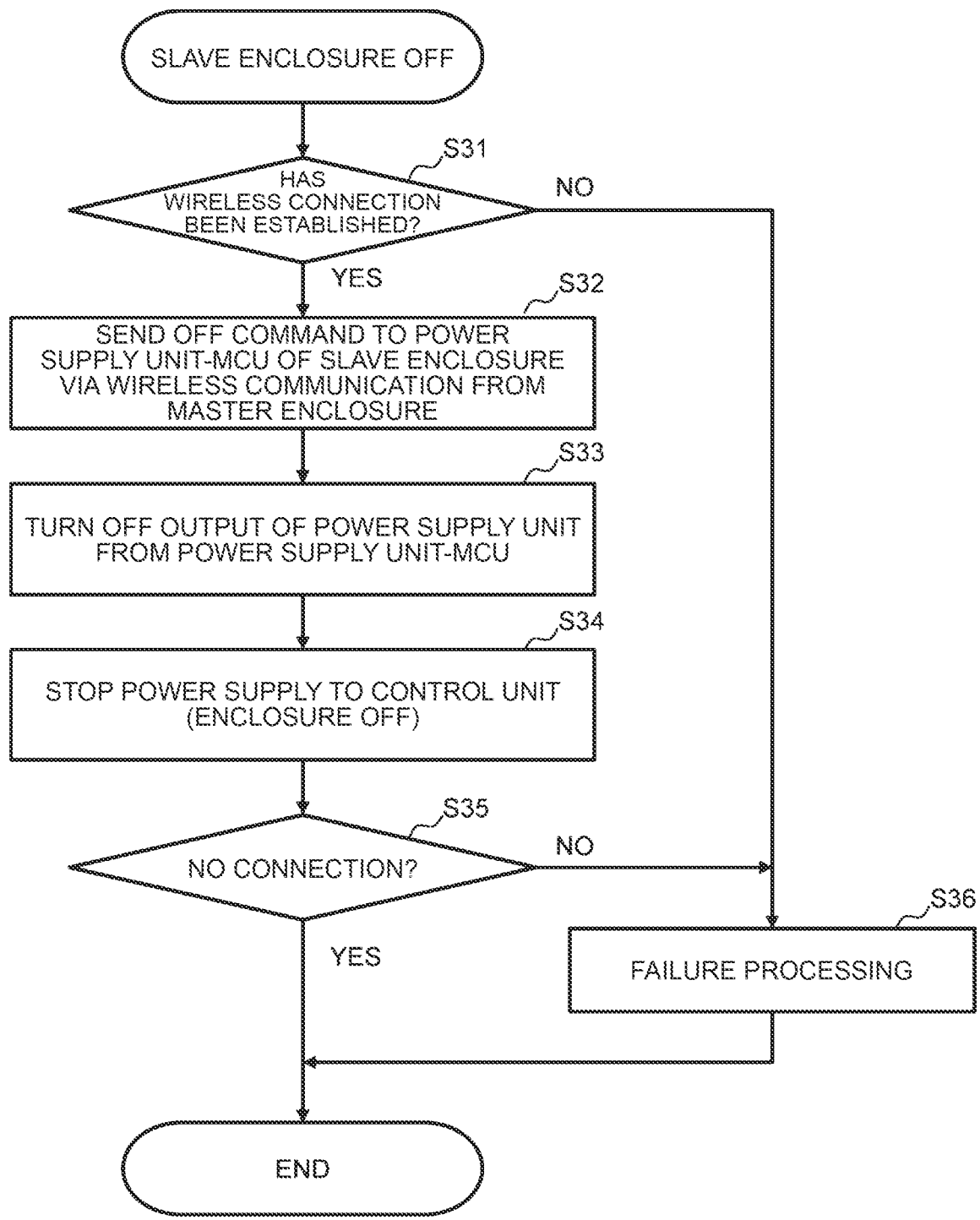
FIG. 12 is a flowchart showing the processing routine of turning OFF the slave enclosure (slave enclosure OFF).

FIG. 12 is a flowchart showing the processing routine of turning OFF the slave enclosure (slave enclosure OFF). FIG. 12 shows the processing of the control unit 130 of the master enclosure 10 instructing the power supply unit 210 of the slave enclosure 20 to stop the power supply to the control unit 230 of the same slave enclosure 20.

According to FIG. 12, foremost, the control-MCU 131 of the master enclosure 10 confirms whether a normal wireless connection has been established between the wireless circuit 133 of its own unit and the power-wireless circuit 217 in the slave enclosure 20 to which the power supply is to be stopped (step S31). When the establishment of a normal wireless connection is confirmed in step S31 (step S31: YES), the processing proceeds to step S32, and when the establishment of a normal wireless connection could not be confirmed (step S31: NO), the processing proceeds to step S36.

In step S32, the control-MCU 131 of the master enclosure 10 uses the wireless communication confirmed in step S31 and requests the power-MCU 216 of the slave enclosure 20 of the wireless connection destination to stop the power supply output (power supply unit output OFF) to the control unit 230.

The power-MCU 216 that received the request of step S32 performs control of opening the switch of the output circuit 214 of the converter 211 (step S33). As a result of the switch open control of the output circuit 214 being performed in step S33, the power supply output (power supply unit output) from the power supply unit 210 to the control unit 230 is stopped, and the slave enclosure 20 enters a power saving status (OFF) (step S34). Note that, after the slave enclosure 20 is turned OFF in step S34, as a result of the control-MCU 131 of the master enclosure 10 requesting and acquiring the status information 310 from the power-MCU 216 of the slave enclosure 20, it can update the status information 300 to be the latest status (status information update after slave enclosure OFF).

Subsequently, the control-MCU 131 of the master enclosure 10 confirms that the control unit 230 (control-MCU 231) of the slave enclosure 20, to which the power supply should have been stopped in step S34, is not communicably connected (step S35). When it is confirmed in step S35 that the control unit 230 (control-MCU 231) of the slave enclosure 20 is not communicably connected (step S35: YES), because this means that the power supply output to the control unit 230 has been stopped, the slave enclosure OFF is normally completed.

As a result of the foregoing processing of steps S31 to S35 being performed, not only can the control-MCU 131 of the master enclosure 10 execute control to an arbitrary slave enclosure 20 connected in a daisy chain so as to stop the power supply to the control unit 230 and cause that slave enclosure 20 to enter a power saving status (OFF), it can also confirm whether the slave enclosure OFF was successful by performing a connection confirmation (reply confirmation) after performing the foregoing control.

Meanwhile, when it is confirmed in step S35 that the control unit 230 (control-MCU 231) of the slave enclosure 20 is communicably connected (step S35: NO), this means that the power supply output to the control unit 230 has not been stopped; that is, the slave enclosure OFF was unsuccessful. Thus, in the foregoing case, the processing proceeds to step S36. In step S36, the control-MCU 131 of the master enclosure 10 performs predetermined error processing such as outputting an error message, and thereafter abnormally ends the slave enclosure OFF. Note that, in step S36, it is also possible to re-execute (retry) the immediately preceding processing that was unsuccessful, and perform error processing when the retry was unsuccessful a predetermined number of times.

Note that, in step S32 of FIG. 12, while the control-MCU 131 of the master enclosure 10 sent a command, via wireless communication, instructing the power-MCU 216 of the slave enclosure 20 to stop the power supply to the control unit 230, because power is being fed to the control unit 230 at such timing, the foregoing command may also be sent via wired communication using the wired cable 31. In the foregoing case, the control-MCU 131 of the master enclosure 10 sends a command from the communication circuit 132 instructing the control-MCU 231 to stop the power supply through the communication circuit 232 of the control unit 230 via wired communication using the wired cable 31, and the control-MCU 231 may additionally forward the foregoing command to the power-MCU 216 via the internal bus 33.

Figure 13:
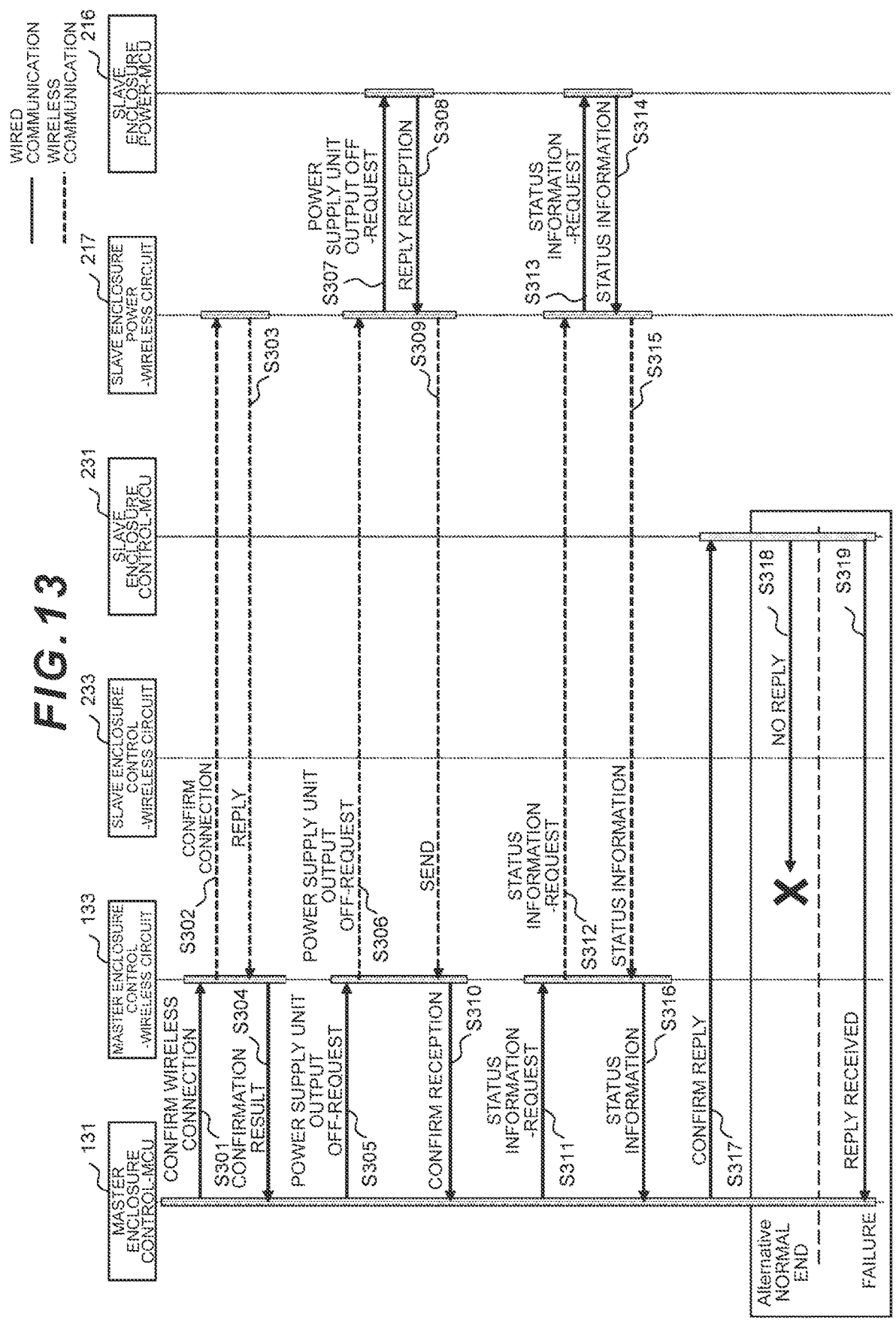
FIG. 13 is a sequence diagram showing the detailed procedures for turning OFF the slave enclosure in FIG. 12.

FIG. 13 is a sequence diagram showing the detailed procedures for turning OFF the slave enclosure in FIG. 12. Specifically, the procedures of steps S301 to S304 of FIG. 13 correspond to the processing of step S31 of FIG. 12, the procedures of steps S305 to S307 (in a broad sense, up to step S310) of FIG. 13 correspond to the processing of step S32 of FIG. 12, the procedures of steps S311 to S316 of FIG. 13 correspond to the processing of the status information update after the slave enclosure OFF explained with reference to FIG. 12, and the procedures of steps S317 to S318 (or step S319) of FIG. 13 correspond to the processing of step S35 of FIG. 12.

According to FIG. 13, foremost, in the control unit 130 of the master enclosure 10, the MCU 131 requests the wireless circuit 133 of its own unit to confirm a wireless connection with the power supply unit 210 of the slave enclosure 20 to which the power supply is to be turned OFF based on wired communication via the internal bus 33 (step S301). The control-wireless circuit 133 that received the request of step S301 requests the power-wireless circuit 217 of the slave enclosure 20, via wireless communication, to confirm the wireless connection (step S302).

When the power-wireless circuit 217 returns a reply via wireless communication in response to the connection confirmation request of step S302 (step S303), the control-wireless circuit 133 sends to the MCU 131 a confirmation result to the effect that the establishment of a normal wireless connection was confirmed (step S304). Note that, when a reply is not returned from the power-wireless circuit 217 in step S303 even after the lapse of a given period, in step S304, the control-wireless circuit 133 sends to the MCU 131 a confirmation result to the effect that the establishment of a normal wireless connection could not be confirmed.

Next, the control-MCU 131 of the master enclosure 10 requests, via wireless communication, the MCU 216 of the power supply unit 210 of the slave enclosure 20, in which a normal wireless connection was confirmed in steps S301 to S304, to stop the power supply unit output (power supply unit output OFF). Specifically, this request for the power supply unit output OFF is sent from the wireless circuit 133 of its own unit to the power-wireless circuit 217 via wireless communication, and then forwarded to the power-MCU 216 of the slave enclosure 20 (steps S305 to S307).

Subsequently, the power-MCU 216 of the slave enclosure 20 that received the power supply unit output OFF request returns a reception reply to the control-MCU 131 of the master enclosure 10 with a path using the wireless communication which is reversed from steps S305 to S307, and performs control of opening the switch of the output circuit 214 of the converter 211 (steps S308 to S310). Either the reception reply or the switch open control of the output circuit 214 may be performed first with a time lag. As a result of the switch of the output circuit 214 of the converter 211 being opened, the power supply output (power supply unit output) from the power supply unit 210 to the control unit 230 is stopped, and the slave enclosure 20 enters a power saving status.

After receiving the reception reply of the power-MCU 216 in response to the power supply unit output OFF request in step S310, the control-MCU 131 of the master enclosure 10 requests the status information to the power-MCU 216 of the slave enclosure 20 with a path using the same wireless communication as steps S305 to S307 (steps S311 to S313).

Subsequently, the power-MCU 216 of the slave enclosure 20 that received the status information request sends the status information 310 retained in its memory to the control-MCU 131 of the master enclosure 10 with a path using the wireless communication that is reversed from steps S311 to 313 (steps S314 to S316). The status information 310 that is sent here has been updated to the latest information and includes, for example, the power supply unit output OFF status.

The control-MCU 131 of the master enclosure 10 thereafter confirms the reply to the MCU 231 of the control unit 230 of the slave enclosure 20 to which the power supply was stopped based on both (or one of either) the wired communication via the wired cable 31 and the wireless communication via the control-wireless circuit 133 (step S317). In FIG. 13, the flow for confirming the reply based on wired communication is shown in steps S317 to S319.

When the reply is confirmed via wired communication in step S317, if the power supply of the control unit 230 has actually been stopped, because the wired communication based on the wired cable 31 is disconnected, the control-MCU 231 does not return a reply to the control-MCU 131 (step S318). Moreover, when the reply is confirmed via wireless communication in step S317, the wireless connection is confirmed from the control-MCU 131 of the master enclosure 10 to the control-wireless circuit 233 of the slave enclosure 20 via the control-wireless circuit 133. Nevertheless, even in the foregoing case, if the power supply of the control unit 230 has actually been stopped, because it is not possible for the control-wireless circuit 133 to wirelessly connect to the control-wireless circuit 233, the control-MCU 131 is unable to obtain a reply to the reply confirmation. In other words, if a reply could not be obtained in response to the reply confirmation of step S317, the control-MCU 131 of the master enclosure 10 can confirm that the power supply OFF of the control unit 230 was successful.

Meanwhile, when the reply is confirmed via wired communication in step S317, if the power supply of the control unit 230 has not actually been stopped, because the wired connection based on the wired cable 31 is maintained, the control-MCU 231 returns a reply to the control-MCU 131 (step S319). Moreover, if the power supply of the control unit 230 has not actually been stopped, even when the reply is confirmed via wireless communication in step S317, because the control-wireless circuit 233 will return a reply via wireless communication to the wireless connection confirmation from the control-wireless circuit 133, the control-MCU 131 can obtain a reply to the reply confirmation. In other words, when a reply to the reply confirmation of step S317 is obtained, the control-MCU 131 of the master enclosure 10 can comprehend that the power supply OFF of the control unit 230 was unsuccessful.

As explained above with reference to FIG. 12 and FIG. 13, with the daisy chain connection system 1 according to this embodiment, the master enclosure 10 can execute control to an arbitrary slave enclosure 20 connected in a daisy chain so as to stop the power supply to the control unit 230 and cause that slave enclosure 20 to enter a power saving status (OFF). Moreover, with the daisy chain connection system 1 according to this embodiment, because the slave enclosure OFF can be realized without having to use a dedicated power supply control device, not only is it possible to yield the effect of reducing the power consumption as a result of controlling the slave enclosure 20 to enter a power saving status, it is possible to avoid various problems that arise when a dedicated power supply control device is added, such as increase of cost, occurrence of power consumption, or enlargement of the overall system.

(3-4) Slave Enclosure ON

The process of "slave enclosure ON" of the master enclosure 10 starting the power supply to the slave enclosure 20 (more specifically, control unit 230), to which the power supply has been stopped based on the slave enclosure OFF explained above, is now explained.

Figure 14:
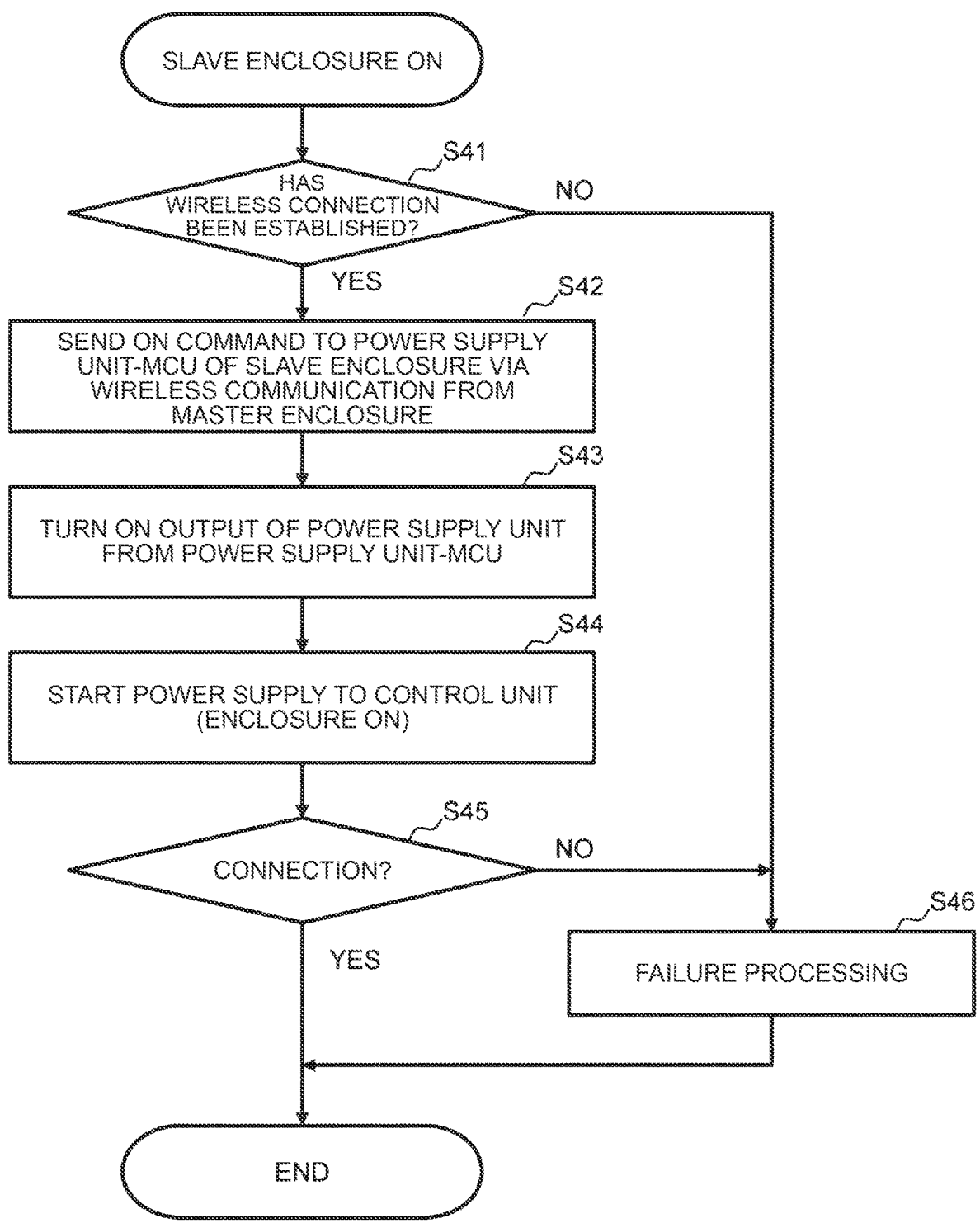
FIG. 14 is a flowchart showing the processing routine of turning ON the slave enclosure (slave enclosure ON).

FIG. 14 is a flowchart showing the processing routine of turning ON the slave enclosure (slave enclosure ON). FIG. 14 shows the processing of the control unit 130 of the master enclosure 10 instructing the power supply unit 210 of the slave enclosure 20, which includes the control unit 230 to which the power supply has been turned OFF, to start the power supply to the control unit 230.

According to FIG. 14, foremost, the control-MCU 131 of the master enclosure 10 confirms whether a normal wireless connection has been established between the wireless circuit 133 of its own unit and the power-wireless circuit 217 in the slave enclosure 20 to which the power supply is to be started (step S41). When the establishment of a normal wireless connection is confirmed in step S41 (step S41: YES), the processing proceeds to step S42, and when the establishment of a normal wireless connection could not be confirmed (step S41: NO), the processing proceeds to step S46.

In step S42, the control-MCU 131 of the master enclosure 10 uses the wireless communication confirmed in step S41 and requests the power-MCU 216 of the slave enclosure 20 of the wireless connection destination to start the power supply output (power supply unit output ON) to the control unit 230.

The power-MCU 216 that received the request of step S42 performs control of closing the switch of the output circuit 214 of the converter 211 (step S43). As a result of the switch close control of the output circuit 214 being performed in step S43, the power supply output (power supply unit output) from the power supply unit 210 to the control unit 230 is started, and the slave enclosure 20 enters a normal status in which power is fed (ON) (step S44). Note that, after the slave enclosure 20 is turned ON in step S44, as a result of the control-MCU 131 of the master enclosure 10 requesting and acquiring the status information 310 from the power-MCU 216 of the slave enclosure 20, it can update the status information 300 to be the latest status (status information update after slave enclosure ON).

Subsequently, the control-MCU 131 of the master enclosure 10 confirms that the control unit 230 (control-MCU 231) of the slave enclosure 20, to which the power supply should have been started in step S44, is communicably connected (step S45). When it is confirmed in step S35 that the control unit 230 (control-MCU 231) of the slave enclosure 20 is communicably connected (step S45: YES), because this means that the power supply output to the control unit 230 is being executed, the slave enclosure ON is normally completed.

As a result of the foregoing processing of steps S41 to S45 being performed, not only can the control-MCU 131 of the master enclosure 10 execute control to an arbitrary slave enclosure 20 connected in a daisy chain so as to start the power supply to the control unit 230, to which the power supply has been stopped, and cause that slave enclosure 20 to enter a normal status (ON), it can also confirm whether the slave enclosure ON was successful by performing a connection confirmation (reply confirmation) after performing the foregoing control.

Meanwhile, when it is confirmed in step S45 that the control unit 230 (control-MCU 231) of the slave enclosure 20 is not communicably connected (step S45: NO), this means that the power supply output to the control unit 230 is still stopped; that is, the slave enclosure ON was unsuccessful. Thus, in the foregoing case, the processing proceeds to step S46. In step S46, the control-MCU 131 of the master enclosure 10 performs predetermined error processing such as outputting an error message, and thereafter abnormally ends the slave enclosure ON. Note that, in step S46, it is also possible to re-execute (retry) the immediately preceding processing that was unsuccessful, and perform error processing when the retry was unsuccessful a predetermined number of times.

FIG. 15 is a sequence diagram showing the detailed procedures for turning ON the slave enclosure in FIG. 14. Specifically, the procedures of steps S401 to S404 of FIG. 15 correspond to the processing of step S41 of FIG. 14, the procedures of steps S405 to S407 (in a broad sense, up to step S410) of FIG. 15 correspond to the processing of step S42 of FIG. 14, the procedures of steps S411 to S416 of FIG. 15 correspond to the processing of the status information update after the slave enclosure ON explained with reference to FIG. 14, and the procedures of steps S417 to S418 (or step S419) of FIG. 15 correspond to the processing of step S45 of FIG. 14.

According to FIG. 15, foremost, in the control unit 130 of the master enclosure 10, the MCU 131 requests the wireless circuit 133 of its own unit to confirm a wireless connection with the power supply unit 210 of the slave enclosure 20 to which the power supply is to be turned ON based on wired communication via the internal bus 33 (step S401). The control-wireless circuit 133 that received the request of step S401 requests the power-wireless circuit 217 of the slave enclosure 20, via wireless communication, to confirm the wireless connection (step S402).

When the power-wireless circuit 217 returns a reply via wireless communication in response to the connection confirmation request of step S402 (step S403), the control-wireless circuit 133 sends to the MCU 131 a confirmation result to the effect that the establishment of a normal wireless connection was confirmed (step S404). Note that, when a reply is not returned from the power-wireless circuit 217 in step S403 even after the lapse of a given period, in step S404, the control-wireless circuit 133 sends to the MCU 131 a confirmation result to the effect that the establishment of a normal wireless connection could not be confirmed.

Next, the control-MCU 131 of the master enclosure 10 requests, via wireless communication, the MCU 216 of the power supply unit 210 of the slave enclosure 20, in which a normal wireless connection was confirmed in steps S401 to S404, to start the power supply unit output (power supply unit output ON). Specifically, this request for the power supply unit output ON is sent from the wireless circuit 133 of its own unit to the power-wireless circuit 217 via wireless communication, and then forwarded to the power-MCU 216 of the slave enclosure 20 (steps S405 to S407).

Subsequently, the power-MCU 216 of the slave enclosure 20 that received the power supply unit output ON request returns a reception reply to the control-MCU 131 of the master enclosure 10 with a path using the wireless communication which is reversed from steps S405 to S407, and performs control of closing the switch of the output circuit 214 of the converter 211 (steps S408 to S410). Either the reception reply or the switch close control of the output circuit 214 may be performed first with a time lag. As a result of the switch of the output circuit 214 of the converter 211 being closed, the power supply output (power supply unit output) from the power supply unit 210 to the control unit 230 is started, and the slave enclosure 20 enters a normal status in which power is fed.

After receiving the reception reply of the power-MCU 216 in response to the power supply unit output ON request in step S410, the control-MCU 131 of the master enclosure 10 requests the status information to the power-MCU 216 to the slave enclosure 20 with a path using the same wireless communication as steps S405 to S407 (steps S411 to S413).

Subsequently, the power-MCU 216 of the slave enclosure 20 that received the status information request sends the status information 310 retained in its memory to the control-MCU 131 of the master enclosure 10 with a path using the wireless communication that is reversed from steps S411 to 413 (steps S414 to S416). The status information 310 that is sent here has been updated to the latest information and includes, for example, the power supply unit output ON status.

The control-MCU 131 of the master enclosure 10 thereafter confirms the reply to the MCU 231 of the control unit 230 of the slave enclosure 20 to which the power supply was started based on both (or one of either) the wired communication via the wired cable 31 and the wireless communication via the control-wireless circuit 133 (step S417). In FIG. 15, the flow for confirming the reply based on wired communication is shown in steps S417 to S419.

When the reply is confirmed via wired communication in step S417, if the power supply of the control unit 230 has actually been started, because the wired communication based on the wired cable 31 is established, the control-MCU 231 returns a reply to the control-MCU 131 (step S418). Moreover, when the reply is confirmed via wireless communication in step S417, the wireless connection is confirmed from the control-MCU 131 of the master enclosure 10 to the control-wireless circuit 233 of the slave enclosure 20 via the control-wireless circuit 133. Even in the foregoing case, if the power supply of the control unit 230 has actually been started, because the control-wireless circuit 233 returns a reply to the wireless connection confirmation from the control-wireless circuit 133 via wireless communication, the control-MCU 131 is able to obtain a reply to the reply confirmation. In other words, if a reply could be obtained in response to the reply confirmation of step S417, the control-MCU 131 of the master enclosure 10 can confirm that the power supply ON of the control unit 230 was successful.

Meanwhile, when the reply is confirmed via wired communication in step S417, if the power supply of the control unit 230 has not actually been started, because the wired connection based on the wired cable 31 is disconnected, the control-MCU 231 does not return a reply to the control-MCU 131 (step S419). Moreover, if the power supply of the control unit 230 has not actually been started, even when the reply is confirmed via wireless communication in step S417, because the control-wireless circuit 133 is unable to wirelessly connect to the control-wireless circuit 233, the control-MCU 131 cannot obtain a reply to the reply confirmation. In other words, when a reply to the reply confirmation of step S417 could not be obtained, the control-MCU 131 of the master enclosure 10 can comprehend that the power supply ON of the control unit 230 was unsuccessful.

As explained above with reference to FIG. 14 and FIG. 15, with the daisy chain connection system 1 according to this embodiment, the master enclosure 10 can execute control to an arbitrary slave enclosure 20 connected in a daisy chain so as to resume the power supply to the control unit 230, to which the power supply has been stopped, and cause that slave enclosure 20 to return to a normal status (ON). Here, with a conventional daisy chain connection system, when a slave enclosure is turned OFF, because there is no means for communicating with that slave enclosure, it was not possible to turn ON that slave enclosure without a dedicated power supply control device. Meanwhile, with the daisy chain connection system 1 according to this embodiment, as a result of the master enclosure 10 and the power supply unit 210 of the slave enclosure 20 being equipped with a wireless circuit, even in a status where the power supply to the control unit 230 of the slave enclosure 20 has been stopped, communication between the master enclosure 10 and the slave enclosure 20 is enabled, and the slave enclosure ON can be realized without the addition of a dedicated power supply control device. Consequently, according to the daisy chain connection system 1 of this embodiment, because it is possible to realize the power saving function (OFF/ON) to an arbitrary slave enclosure 20 in the system without having to add a dedicated power supply control device, not only is it possible to yield the effect of reducing the power consumption as a result of realizing the power saving function, it is possible to avoid various problems that arise when a dedicated power supply control device is added, such as increase of cost, occurrence of power consumption, or enlargement of the overall system.

Note that the present invention is not limited to the embodiment described above, and may include various modified examples. For example, the foregoing embodiment was explained in detail for explaining the present invention in an easy-to-understand manner, and the present invention does not need to necessarily comprise all of the configurations explained in the foregoing embodiment. Moreover, another configuration may be added to, deleted from or replaced with a part of the configuration of the foregoing embodiment.

Moreover, a part or all of the respective components, functions, processing units, and processing means described above may be realized with hardware such as by designing an integrated circuit. Moreover, each of the foregoing configurations and functions may also be realized with software by a processor interpreting programs for realizing the respective functions and executing such programs. Information such as programs, tables and files that realize the respective function may be stored in a memory, a storage device such as a hard disk or SSD (Solid State Drive), or a storage medium such as an IC card, SD card, or DVD.

Moreover, in the appended drawings, control lines and information lines are illustrated to the extent required for the explanation, and not all control lines and information lines required for the product are not necessarily illustrated. In effect, it should be understood that all configurations are mutually connected.

REFERENCE SIGNS LIST

1 daisy chain connection system
10 master enclosure
20 slave enclosure
31 wired cable
32 power cable
33 internal bus
110 power supply unit
111, 211 converter
112, 131, 216, 231 MCU
113, 213 input circuit
114, 214 output circuit
115, 215 AUX output circuit
130, 230 control unit
132, 232 communication circuit
133, 217, 233 wireless circuit
134, 218, 234 antenna
135, 219, 235 transmission/reception circuit
136, 220, 236 wireless control unit
210 power supply unit
212 AUX power supply device
230 control unit
250 drive
300, 310 status information
320 device information
330 wireless module device information

The invention claimed is:

1. A daisy chain connection system in which a first information equipment is in connection with and controls a plurality of second information equipment wire-connected in a daisy chain,
    wherein the second information equipment comprises:
        a control unit which performs information processing control in its own information equipment; and
        a power supply unit which performs power supply control of feeding externally supplied power to its own information equipment and to the control unit,
    wherein the first information equipment and the control unit of the second information equipment include a communication circuit capable of wired communication using a wired connection,
    wherein the first information equipment and the power supply unit of the second information equipment include a wireless circuit capable of mutual wireless communication based on wireless connection,
    wherein, when turning OFF a power supply to any one of the second information equipment, the first information equipment requests the power supply unit of the second information equipment to stop the power supply by using the wireless communication, and the power supply unit performs control for stopping the power supply to the control unit according to the request,
    wherein, when turning OFF a power supply to any one of the second information equipment, after the power supply unit performs control for stopping the power supply to the control unit, and
    wherein the first information equipment confirms a connection status with the control unit, and when the confirmation of the connection status is not received, determines the turning OFF of the power supply to the second information equipment was successful.

2. The daisy chain connection system according to claim 1,
    wherein the control unit of the second information equipment further includes the wireless circuit capable of wireless communication with the first information equipment based on wireless connection.

3. The daisy chain connection system according to claim 1,
    wherein, when turning ON a power supply to any one of the second information equipment, the first information equipment requests the power supply unit of the second information equipment to start the power supply by using the wireless communication, and the power supply unit performs control for starting the power supply to the control unit according to the request.

4. The daisy chain connection system according to claim 3,
    wherein, when turning ON a power supply to any one of the second information equipment, after the power supply unit performs control for starting the power supply to the control unit,
    the first information equipment confirms a connection status with the control unit, and determines whether the turning ON of the power supply to the second information equipment was successful based on a result of the confirmation.

5. A system control method in a daisy chain connection system in which a first information equipment is in connection with and controls a plurality of second information equipment wire-connected in a daisy chain,
    wherein the second information equipment includes a control unit which performs information processing control in its own information equipment, and a power supply unit which performs power supply control of feeding externally supplied power to its own information equipment, wherein the first information equipment and the control unit of the second information equipment include a communication circuit capable of wired communication using a wired connection, wherein the first information equipment and the power supply unit of the second information equipment include a wireless circuit capable of mutual wireless communication based on wireless connection, wherein, when turning OFF a power supply to any one of the second information equipment, the system control method comprises:
- a power supply stop request step of the first information equipment requesting the power supply unit of the second information equipment to stop the power supply by using the wireless communication; and
- a power supply stop implementation step of the power supply unit performing control for stopping the power supply to the control unit according to the request in the power supply stop request step, wherein, when turning OFF a power supply to any one of the second information equipment, after the power supply unit performs control for stopping the power supply to the control unit, and the system control method further comprises:
- a power supply OFF determination step of the first information equipment confirming a connection status with the control unit, and when the confirmation of the connection status is not received, determining the turning OFF of the power supply to the second information equipment was successful.

6. The system control method according to claim 5, wherein the control unit of the second information equipment further includes the wireless circuit capable of wireless communication with the first information equipment based on wireless connection.

7. The system control method according to claim 5, wherein, when turning ON a power supply to any one of the second information equipment, the system control method comprises:
- a power supply start request step of the first information equipment requesting the power supply unit of the second information equipment to start the power supply by using the wireless communication; and
- a power supply start implementation step of the power supply unit performing control for starting the power supply to the control unit according to the request in the power supply start request step.

8. The system control method according to claim 7, wherein, when turning ON a power supply to any one of the second information equipment, after the power supply unit performs control for starting the power supply to the control unit, the system control method further comprises:

a power supply ON determination step of the first information equipment confirming a connection status with the control unit, and determining whether the turning ON of the power supply to the second information equipment was successful based on a result of the confirmation.

* * * * *